United States Patent [19]
Molnar et al.

[11] Patent Number: 5,507,845
[45] Date of Patent: Apr. 16, 1996

[54] PLANT SOD MATS

[75] Inventors: Charles J. Molnar, 12 Malvern Ct. Devon, Wilmington, Del. 19810; William H. Mitchell, Newark, Del.

[73] Assignees: Charles J. Molnar; Judith R. Molnar, both of Wilmington, all of Del.

[21] Appl. No.: 321,311

[22] Filed: Oct. 11, 1994

[51] Int. Cl.$^6$ .................................................. A01L 1/04
[52] U.S. Cl. ........................... 47/1.01; 47/56; 405/258
[58] Field of Search ...................... 47/1 F, 66 S, 58 C, 47/58 CO; 404/16, 258

[56] References Cited

U.S. PATENT DOCUMENTS

| | | | |
|---|---|---|---|
| 3,446,122 | 5/1969 | Raichle et al. | 94/7 |
| 4,023,506 | 5/1977 | Robey | 111/1 |
| 4,190,981 | 3/1980 | Muldner | 47/56 |
| 4,336,668 | 6/1982 | Decker | 47/58 |
| 4,342,807 | 8/1982 | Rasen et al. | 428/180 |
| 4,389,434 | 6/1983 | Polman | 428/17 |
| 4,396,653 | 8/1983 | Tomarin | 47/DIG. 13 |
| 4,564,310 | 1/1986 | Thelen et al. | 404/31 |
| 4,637,942 | 1/1987 | Tomarin | 428/17 |
| 4,720,935 | 1/1988 | Rogers et al. | 47/56 |
| 4,777,763 | 10/1988 | Shannon et al. | 47/74 |
| 4,786,308 | 11/1988 | Colling | 71/24 |
| 4,786,550 | 11/1988 | McFarland et al. | 428/203 |
| 4,790,691 | 12/1988 | Freed | 405/263 |
| 4,803,803 | 2/1989 | Moffet, Jr. | 47/59 |
| 4,819,933 | 4/1989 | Armond | 272/3 |
| 4,867,614 | 9/1989 | Freed | 405/263 |
| 4,900,010 | 2/1990 | Wengmann | 272/3 |
| 4,934,094 | 6/1990 | Walton | 47/56 |
| 4,941,282 | 7/1990 | Milstein | 47/58 |
| 4,959,926 | 10/1990 | Moffet, Jr. | 47/59 |
| 4,986,026 | 1/1991 | Decker | 47/56 |
| 5,014,462 | 5/1991 | Malmaren et al. | 47/1.01 |
| 5,020,936 | 6/1991 | Malmgren et al. | 404/32 |
| 5,177,898 | 1/1993 | Decker | 47/56 |
| 5,189,833 | 3/1993 | Clark | 47/56 |
| 5,224,292 | 7/1993 | Anton | 47/64 |
| 5,301,466 | 4/1994 | Egan | 47/58 |
| 5,326,192 | 7/1994 | Freed | 405/258 |
| 5,344,470 | 9/1994 | Molnar et al. | 47/58 |
| 5,345,713 | 9/1994 | Molnar et al. | 47/56 |
| 5,346,514 | 9/1994 | Molnar et al. | 47/58 |
| 5,358,356 | 10/1994 | Romanek | 47/56 |
| 5,404,671 | 4/1995 | Farrow, Jr. et al. | 47/1.01 |

FOREIGN PATENT DOCUMENTS

| | | | |
|---|---|---|---|
| 403008 | 12/1990 | European Pat. Off. | 47/1 F |
| 1126663 | 3/1962 | Germany | 47/56 |
| 1801460 | 4/1970 | Germany | 47/56 |
| 3723364 | 1/1989 | Germany | 47/56 |
| 34361 | 6/1987 | Japan | 47/56 |
| 2167927 | 6/1990 | Japan | 47/56 |

OTHER PUBLICATIONS

"Turf Grids 'Tough Stuff for Sports Turf'" by Stabilizer, Phoenix, AZ.

"Fiber Grids Fibrillated Polypropylene Fibers for Soil Reinforcement," Synthetic Industries, Chattanooga, TN brochure FG–1–Nov. 1993 15 M.

LandLok® Erosion Mats, published by Synthetic Industries, Chattanooga, TN, Brochure LL–B–3–Mar. 1993.

LandLok® Erosion Mat Installation Guidelines, published by Sythetic Industries, Chattanooga, TN, Brochure 11–1G–2–Nov. 1991.

"Recycling project to provide concert goers Solid Foundation" by Jesse–Lynn Kerr, Florida Times–Union, Jacksonville Fla., Feb. 16, 1994.

"Rubber plus compost tackles soil compaction" by Geri Anderson, Turf West, May 1994, p. 26.

"Developing Wild Flower Sods" by Airhart et al, Hort Science 18(1):89–91, 1983.

"Production of Ground Covers in a Sod Like Manner" by Sterrett et. al, Hort Science vol. 12 (5) Oct. 1977 pp. 492–494.

"Selecting Erosion Control Fabrics" by J M Roberts and J L Sipes, Landscape Architecture, Sep. 1993, pp. 72–74.

*Primary Examiner*—Henry E. Raduazo

[57] ABSTRACT

This invention relates to sod and turf having modified planting mediums and a synthetic sod reinforcement. The sod mats are propagated quickly and are very effective in use. The sod mats are especially effective for soil stabilization and sports fields.

41 Claims, 5 Drawing Sheets

5,507,845

PLANT SOD MATS

BACKGROUND

Reinforced sods have long been known in the art. Sod mats of groundcovers, flowers, and playing field grasses are among the examples.

Molnar (U.S. Pat. No. 5,346,514) discloses flower and groundcover sod mats reinforced with nylon sod reinforcements. Freed (U.S. Pat. No. 5,326,192) discloses turf surfaces reinforced with discrete fibrous material. Egan (U.S. Pat. No. 5,301,466) discloses playing field sod mats with carefully adjusted sand contents. Anton (U.S. Pat. No. 5,224,292) discloses a plant-growing nonwoven mat comprising a layer of hollow organic fibers having therein water soluble plant adjuvants. Clark (U.S. Pat. No. 5,189,833) discloses reinforced grass sod mats. Decker (U.S. Pat. No. 5,177,898) discloses a novel method to grow sod. Malmgren (U.S. Pat. No. 5,020,936) discloses an animal running surface having shredded rubber therein. Malmgren (U.S. Pat. No. 5,014,462) discloses soil amendment of turf with rubber particles. Moffet (U.S. Pat. No. 4,959,926) discloses a plant growth medium having small tufts of mineral wool fibers. Decker (U.S. Pat. No. 4,986,026) discloses tall fescue sod mats which are very large and employ planting mediums containing straw and sewage sludge. Milstein (U.S. Pat. No. 4,941,282) discloses wildflower sod mats reinforced with polyester fabrics. Walton (U.S. Pat. No. 4,934,094) discloses a grass sod reinforced with netting. Wengmann (U.S. Pat. No. 4,900,010) discloses an athletic field surface having therein flexible fibers and tree bark. Armond (U.S. Pat. No. 4,819,933) discloses a suitable surface for equestrian use using a sand mixture and polymeric fibers. Freed (U.S. Pat. No. 4,790,691) discloses composite mixtures of soil and fiber. McFarland (U.S. Pat. No. 4,786,550) discloses a lightweight seed mat formed with melt blown nonwovens. Shannon (U.S. Pat. No. 4,777,763) discloses plant growing medium having fibers. Rogers (U.S. Pat. No. 4,720, 935) discloses a growing medium having fibers. Thelen (U.S. Pat. No. 4,564,310) discloses a resilient playing field composition for play field sports fields. Decker (U.S. Pat. No. 4,336,668) discloses a novel method of growing groundcover sods reinforced with synthetic netting. Muldner (U.S. Pat. No. 4,190,981) discloses a complex lightweight seed mat using complex expensive equipment. Airhart in Hort-Science 18(1), 89–91, 1983 discloses groundcover and flower sods reinforced with synthetic netting.

In general, reinforced sod mats suffer from some important commercial drawbacks. With netting reinforcements, if the openings are large, harvest is usually delayed, while if the netting openings are small, the roots of the plants can be girdled. Neither leads to sod mats with both optimum sod mat production and growing characteristics. If the netting openings are large, the netting can also be troublesome to completely cover with planting medium. In addition, known reinforced sod mats do not have early planting medium stability to rains to prevent erosion during planting and early germination along with good long term resistance to surface soil erosion in particularly aggressive applications. Sod mats with both good short term and long term resistance to erosion which are also quick and easy to propagate are especially needed. Narrow accent strips for borders of ornamental plants are particularly difficult to propagate with good handling characteristics because many desirable accent or border plant strip sods have lower than desired root strength and/or root density. The consequences of this are plant sod strips have to tender edges and/or extended propagation times. Many sod mats known in the art use higher than required synthetic resins which add unnecessary costs to the sod mats.

In view of the above background, there still exists a need for sod mats which have a tough, stable surface layer combined with a 3 dimensional reinforcement structure which uses a minimum of synthetic resin and which can be quickly and easily propagated. There still exists a need for sod mats with improved stability to early, heavy rains, improved stability during very early harvesting, and improved planting medium binding for plants with less than optimum rooting structure. There still is a need for sod mats with both good short term and long term resistance to erosion which are also quick and easy to propagate for use in highway embankments and culverts. There still is a need for sod mats with the advantages of improved softness for foot paths and playing fields combined with improved long term soil stabilization performance for areas of high erosion potential and improved resistance to soil compaction. There still is a need for impact absorbing sod mats which improve the efficiency and effectiveness of fiber reinforcement and soft impact absorbing elastomers. There still is a need to develop improved accent border sods. There still is a need to minimize the consumption of synthetic resin in these stabilized sod mats. There still is a need to develop a manufacturing process for these sod mats with good production characteristics. Examples of good production characteristics are improved resistance to erosion from heavy rains, reduced propagation times along with reduced sensitivity to root binding, and improved sod mat handling characteristics. There still is a need for sod mats which can be harvested in very large rolls, easily transported, and rapidly installed on playing fields or sites requiring soil stabilization which have the above advantages.

New sod mats of this invention have a tough, stable surface layer combined with a 3 dimensional reinforcement structure which uses a minimum of synthetic resin and which can be quickly and easily propagated. New sod mats of this invention have a unique combination of reinforced layer of planting medium and sod reinforcements which have improved stability to early, heavy rains, improved stability during very early harvesting, and improved planting medium binding for plants with less than optimum root strength and density. New sod mats of this invention have both improved short term and long term resistance to erosion which are also quick and easy to propagate for use in highway embankments and culverts. New sod mats of this invention have advantages of improved softness for foot paths and playing fields combined with improved long term sod stabilization performance for areas of high erosion potential and improved resistance to soil compaction. Sod mats of this invention form improved accent and border plant sod mats. Impact absorbing sod mats with improved efficiency and effectiveness of fiber reinforcement and impact absorbing soft synthetic resin particles are developed in this invention. Sod mats of this invention minimize the consumption of synthetic resin in stabilized sod mats. A manufacturing process is developed for these sod mats with good production characteristics. Examples of good production characteristics are resistance to erosion from heavy rains, reduced propagation times along with reduced sensitivity to root binding, and improved sod mat handling characteristics. New sod mats are developed which can be harvested in very large rolls, easily transported, and rapidly installed on playing fields or sites requiring soil stabilization which have the above advantages.

Other objects and advantages of the current invention will become more apparent to those skilled in the art in view of the following description and examples.

BRIEF DESCRIPTION OF DRAWING FIGURES

A brief description of the figures and reference numerals follows.

REFERENCE NUMERALS IN DRAWINGS

Figure 1:
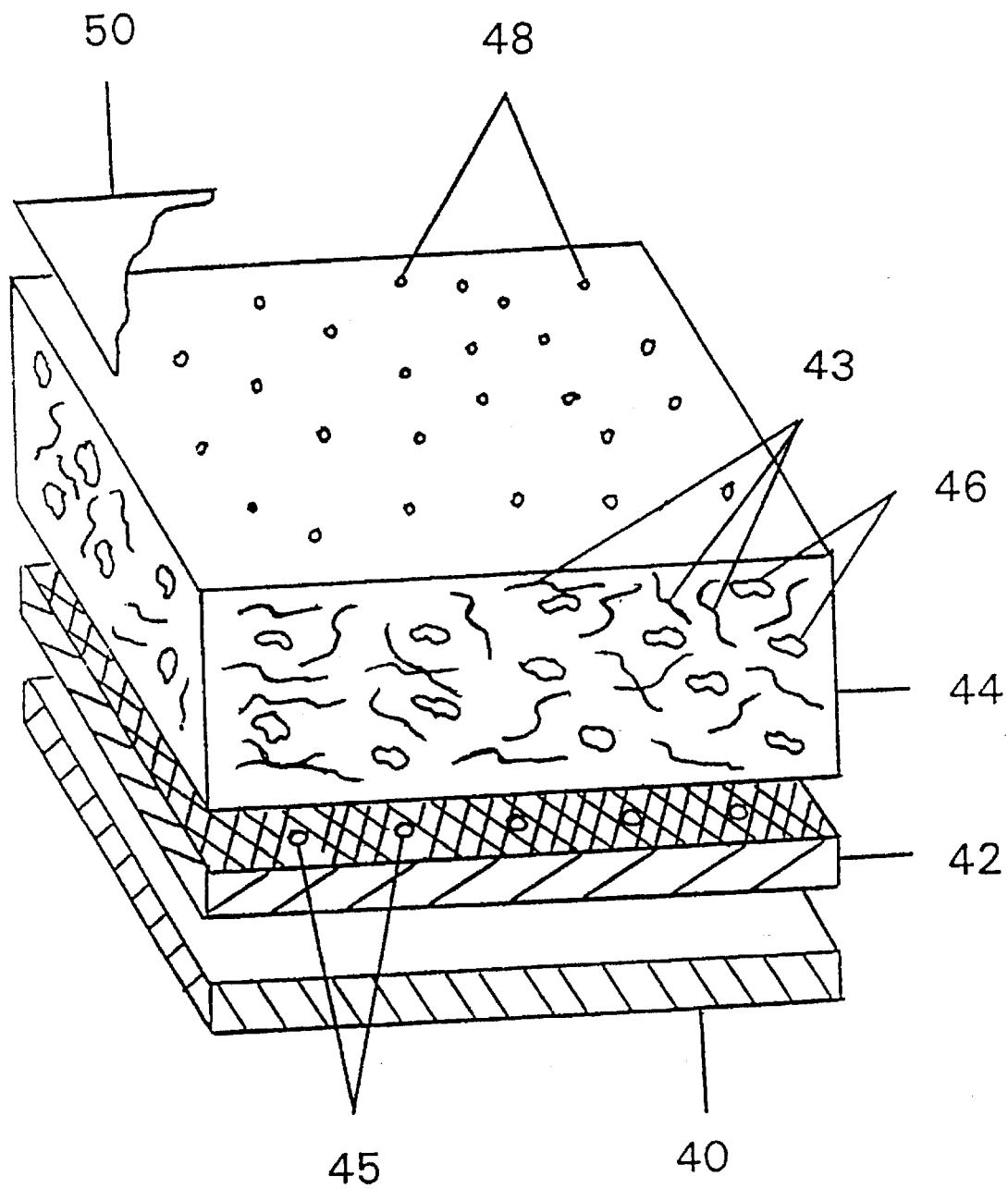
FIG. 1 is a simplified perspective view of a newly planted sod mat.

40 Sod growing surface
42 Sod reinforcement
43 Discrete fibers reinforcing the planting medium
44 Layer of planting medium
45 Apertures
46 Soft synthetic resin planting medium amendment
48 Plant starting material
50 Crop cover
52 Plants ready for harvest
54 Plant roots
55 Roots of the upper root portion which entangle with the discrete fibers reinforcing the layer of planting medium
56 Roots of the lower root portion which penetrate the sod reinforcement
58 Sod reinforcement fibers
60 Mature plants of transplanted sod mat
62 Roots of upper root portion of mature plants entangled with the discrete fibers reinforcing the planting medium
64 Roots of lower root portion of mature plant penetrating the sod reinforcement
66 Mature plant roots bonding the sod mat to the soil below
70 Preparing a sod growing surface.
72 Placing sod reinforcement on top of the sod growing surface.
74 Forming a layer of planting medium having dispersed discrete fibers.
76 Placing viable plant starting material in contact with layer of planting medium.
78 Nourishing viable plants for root growth forming an upper root portion and lower root portion.
80 Propagating upper root portion to form a substantially continuous maze of roots and discrete fibers in the planting medium.
82 Propagating lower root portion to penetrate and entangle with said sod reinforcement.

SUMMARY

Our sod mat invention is a new plant sod mat comprising a sod reinforcement and a layer of planting medium on said sod reinforcement and stable discrete fibers dispersed in said layer of planting medium and wherein said discrete fibers are separate from and unconstrained by said sod reinforcement and viable plants in said layer of planting medium and said viable plants having an upper root portion and a lower root portion and said upper root portion entangles with said discrete fibers to form a maze reinforcing said layer of planting medium and said lower root portion penetrates and entangles with said sod reinforcement in order to bind said layer of planting medium and said plants to said sod reinforcement. A sod mat as described above with an EDFVP of from 1 to 0.01% is preferred and an EDFVP of from 0.3 to 0.01% is more preferred and an EDFVP of from 0.1 to 0.01% is even more preferred and an EDFVP of between 0.08 to 0.01% is most preferred. A sod mat as described above wherein said discrete fibers are synthetic resin fibers of less than 25 dtex are preferred and said synthetic resin fibers of less than 8 dtex are more preferred and said synthetic resin fibers of less than 6 dtex are even more preferred and said synthetic resin fibers of less than 3 dtex are most preferred. A sod mat described above further comprising soft synthetic resin particles dispersed in said planting medium and locked into said maze of upper root portion and discrete fibers in said layer of planting medium.

Our new method of propagating plant sod mats on a sod growing surface comprises a) placing a sod reinforcement on top of the sod growing surface and b) forming a layer of planting medium and dispersed discrete fibers on said sod reinforcement wherein said dispersed fibers have an EDFVP of less than 3% and c) placing viable plant starting material in contact with said layer of planting medium and d) nourishing said plant starting material in order to form viable plants with root growth and said root growth having a upper root portion and a lower root portion and e) propagating said upper root portion to form a substantially continuous maze of entangled roots and discrete fibers in said layer of planting medium and dispersed discrete fibers and f) propagating said lower root portion to penetrate and entangle with said sod reinforcement. A method of propagating sod mats as above wherein the step d) comprises nourishing viable plants to form on substantially all of said viable plants said upper root portion having multiple roots and said lower root portion which penetrates sod reinforcement is preferred. A method of propagating sod mats as above wherein the step f) comprises propagating said lower root portion to penetrate said sod reinforcement and said lower root portion which penetrates said sod reinforcement is greater than 0.07 grams per 400 square centimeters of said sod mat is more preferred.

Our new method of propagating sod mats on a sod growing surface comprises a) placing a sod reinforcement on top of the sod growing surface and b) forming a layer of planting medium with dispersed discrete fibers and soft synthetic resin particles on top of said sod reinforcement and wherein said dispersed fibers have an EDFVP of less than 3% and said soft synthetic resin particles are comprised of soft synthetic resin having a Shore A hardness of less than or equal to 80 and c) placing viable plant starting material in contact with said layer of planting medium and d) nourishing said plant starting material in order to form viable plants with root growth and said root growth having a upper root portion and a lower root portion and e) propagating said upper root portion to form a substantially continuous maze of roots and discrete fibers in said layer of planting medium with dispersed discrete fibers and soft synthetic resin particles and f) propagating said lower root portion to penetrate and entangle with said sod reinforcement. A method to propagate sod mats as above wherein said step e) comprises propagating said upper root portion with multiple roots to form a substantially continuous maze of roots and discrete fibers in order to bind a substantial quantity of said soft synthetic resin particles within said maze is preferred.

Based on our instant invention, we have by figures, explanation, and example shown how to effectively propagate and use these sod mats for specific customer needs.

DESCRIPTION OF PREFERRED EMBODIMENTS—FIGS. 1–4

FIG. 1 is a fragmentary cross section of one embodiment of a sod mat according to this invention. A sod mat of this invention is a plant sod mat which is reinforced using discrete fibers, plant roots, and a sod reinforcement. The sod reinforcement is comprised of a synthetic sod reinforcement. Reference Numeral 40 is a suitable sod growing surface such as a heavy (e.g. 6 mil) black polyethylene film. Other surfaces such as plywood, heavy perforated plastic film, rubber sheets, or concrete may also be used. In a field grown application, the sod growing surface prevents or substantially retards weeds from growing into and through the sod mat from below and also encourages the plant roots to grow laterally and entangle with the sod reinforcement. In a flat grown application, the bottom of the flat normally serves as the sod growing surface. Good drainage in the flat is important. Reference Numeral 42 is the sod reinforcement. Sod reinforcements with good drainage are particularly preferred for sports playing fields and golf courses. Preferred examples are discussed herein below. Reference Numeral 43 represents the discrete fibers reinforcing the layer of planting medium. Reference Numeral 44 is the layer of planting medium. The layer of planting medium is adjusted to the optimum depth for the particular plant species. For sod mats of this invention, different planting mediums can be used such as REDI-EARTH® and METRO-MIX® manufactured by W. R. Grace or an MSW (municipal solid waste). Composted waste products are particularly useful because of their general low cost and light weight. Soil mixes and sand mixes can also be used effectively. Further examples of suitable planting mediums are disclosed in U.S. Pat. No. 4,720,935 by Rogers et. al., U.S. Pat. No. 4,934,094 by Walton, U.S. Pat. No. 4,941,282 by Milstein, U.S. Pat. No. 4,986,026 by Decker, and U.S. Pat. No. 5,301,466 by Egan and are included by reference. Planting mediums including granular and/or small discrete particles are particularly preferred. REDI-EARTH®, MSW, sand mixes, and soil are some nonlimiting examples of these planting mediums to serve as helpful guidance for those of ordinary skill in the art. Sand mixes are particularly preferred for sports fields and golf course applications because of their good drainage. Reference Numeral 45 represents apertures or holes in the sod reinforcement. Reference Numeral 46 represents soft synthetic resin particles added to the layer of planting medium in some preferred embodiments of this invention. Reference Numeral 48 represents the plant starting materials. Representative plant starting materials include seeds, seedlings, plant plugs, rooted cuttings, root divisions, cuttings, rhizomes, stolons, and viable plant materials derived from plant tissue cultures and the like. Seeds are preferred for many plants because of their lower cost and ease of application. Seedlings, rooted cuttings and the like are spaced according to the particular plant species but normally are spaced on a 5 to 20 cm grid pattern. Seeding rates depend on the specific plant species or specific mixture of species but normally are from about 0.3 to 80 lbs per acre. Reference Numeral 50 represents optional crop cover which can aid early germination, can provide shade, and/or give some protection from marauding birds.

Figure 2:
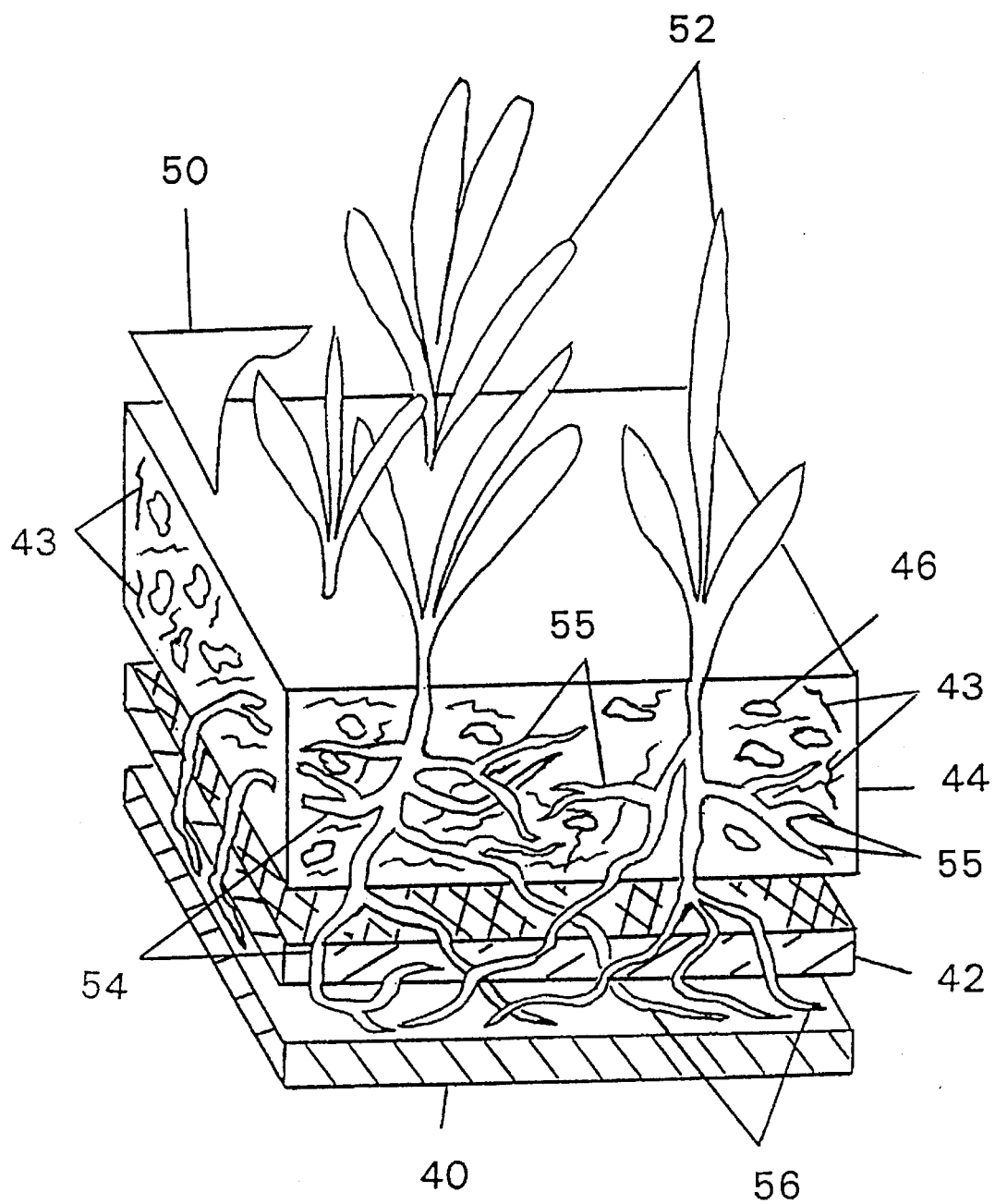
FIG. 2 is a simplified perspective view of a sod mat ready for harvest.

FIG. 2 is a fragmentary cross section of one embodiment of a sod mat ready for harvest according to this invention. Reference 40 is a suitable sod growing surface. Reference Numeral 42 is the synthetic sod reinforcement. Reference Numeral 43 represents the discrete fibers reinforcing the layer of planting medium. Reference Numeral 44 is the layer of planting medium. Reference Numeral 46 represents soft synthetic resin particles added to the planting medium as an amendment. Reference Numeral 50 represents an optional crop cover such as hay or well known nonwoven fabric crop cover to give some overwintering protection. Reference Numeral 52 depicts the plants ready for harvest. A preferred class of plants is nutritional plants which is comprised of herbs and vegetables. Nutritional plants can be used in borders. Representative examples of nutritional sod mats include sods of thyme and cherry tomatoes. A preferred class of plants is ornamental plants which is comprised of flowers and groundcovers. Representative examples of ornamental plants include bedding plants, liriope spicata, ivy, cosmos, and hostas. A particularly preferred class of ornamental plant is comprised of wildflowers. Another particularly preferred class of plants is garden plants which consists of nutritional and ornamental plants. Border plant sod strips of herbs, groundcovers, and flowers are preferred. Border plant sod mat strips of groundcovers are especially preferred. As used in this specification border plant sod mat strips are sod mats which are less than 12 inches wide, and more preferably less than about 10 inches wide and even more preferably less than 8 inches wide. Border sod mat strips of greater than 3 inches are preferred and border strip sod mat strips of greater than 4 inches are more preferred. Border plant sod mat strips with a ratio of the length to the width of the sod mat of greater than about 2/1 are preferred and border plant sod mat strips with a ratio of the length to the width of the sod mat of greater than 4/1 are more preferred and border plant sod mat strips with a ratio of the length to the width of the sod mat of greater than 6/1 are even more preferred and border plant sod mat strips with a ratio of the length to the width of the sod mat of greater than 10/1 are most preferred. Border plant sod mat strips with a ratio of the length to the width of the sod mat of less than 200/1 are preferred and border plant sod mat strips with a ratio of the length to the width of the sod mat of less than 100/1 are more preferred. A particularly preferred class of plants is grasses. Specialty grasses is a preferred class of grasses which is comprised of fine fescue grasses and shade grasses. Representative examples of bunch grasses are fine fescue grass and creeping red rescue grass. A preferred class of grasses is utility grasses. Utility grasses are used on home lawns, roadsides, and playing fields. Illustrative examples of utility grasses are Kentucky Blue grass, perennial rye grass, and tall rescue. A preferred class of grasses is fine textured grasses. Fine textured grasses are often used on golf courses. Illustrative examples of fine textured grasses are bent grasses and fine Bermuda grasses. Reference Numeral 54 represents the plant roots of the sod mat ready for harvest which bind the planting medium to the sod reinforcement. Reference Numeral 55 represents the plant roots of the upper root portion entangled with the discrete fibers reinforcing the planting medium. The upper root portion is the plant roots in the layer of planting medium above the sod reinforcement. In Reference Numeral 55, the upper root portion depicted shows a representative illustration of an upper root portion having multiple roots. Reference Numeral 56 are the plant roots of the lower root portion which penetrate the sod reinforcement. The lower root portion is the plant roots which are in the sod reinforcement and below the sod reinforcement. The plant roots of the upper root portion, which entangle with the discrete fibers dispersed in the layer of planting medium, combined with the roots of the lower root portion, which penetrates and entangle with the synthetic sod reinforcement, are surprisingly quick to develop and surprisingly stable once developed. The discrete fibers in the layer of planting medium aid in the early development of a maze of entangled roots of the upper root portion and discrete fibers in the planting medium. A substantially continuous maze of the entangled roots of the upper root portion and the discrete fibers is often formed. A substantially continuous maze in the context used herein means that a substantial majority of the roots in the upper root portion are either entangled with other roots or with the discrete fibers and also a substantial majority of the discrete fibers are entangled with roots in the upper root portion or with other discrete fibers to create an tangled mass of discrete fibers and roots. Thus a substantially continuous maze is a coherent web of tangled roots and discrete fibers in the layer of planting medium. This maze of roots of the upper root portion and discrete fibers aid in early harvest of sod mats with good handling characteristics.

Figure 3:
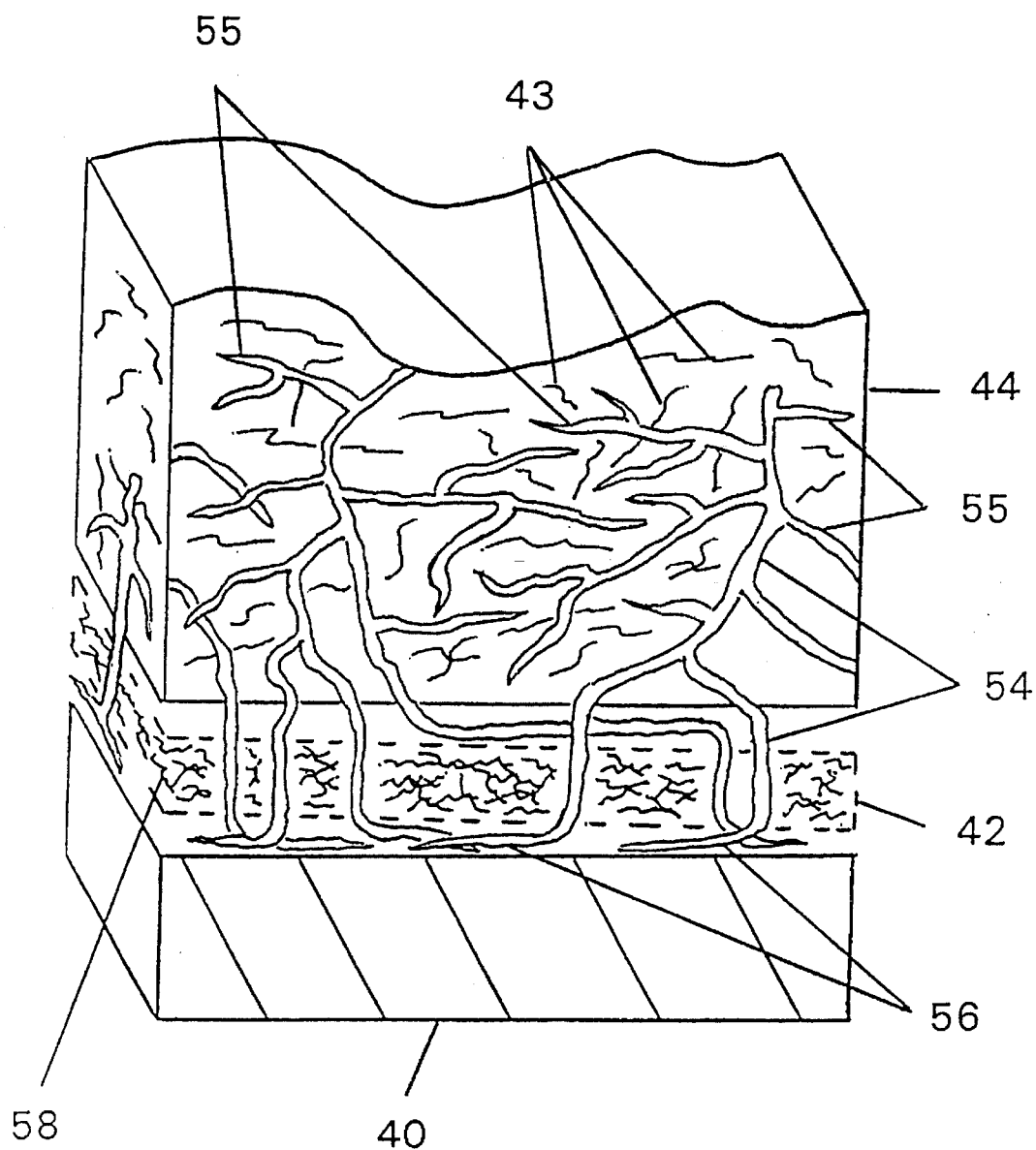
FIG. 3 is an artist's conception of the 3 dimensional root entanglement in a sod mat ready for harvest.

FIG. 3 is an artist's expanded view of one embodiment of a mature sod mat ready for harvest according to this invention to better show some of the key characteristics. Reference Numeral 40 represents the sod growing surface. Reference Numeral 42 is the sod reinforcement. Reference Numeral 43 represents the discrete fibers in the planting medium. Reference Numeral 44 represents the planting medium. Reference Numeral 54 represents the plant roots of the sod mat ready for harvest which bind the planting medium to the sod reinforcement. Reference Numeral 55 represents the roots of the upper root portion entangled with the discrete fibers in the layer of planting medium. In Reference Numeral 55, is a representative artist's illustration of an upper root portion having multiple roots. As the sod is propagated, the discrete fibers begin to entangle into a maze of growing roots and discrete fibers which tends to shorten propagation times and improve early sod mat handling characteristics. These discrete fibers in the layer of planting medium also reduce the effective amount of roots in the planting medium necessary to have good sod mat handling characteristics and thus reduce the likelihood of producing root bound sod mats. Reference Numeral 56 are the plant roots of the lower root portion which penetrate and entangle with the sod reinforcement. Reference Numeral 58 represents the fibers in the sod reinforcement.

By integrating synthetic sod reinforcements and fiber reinforced planting mediums with the binding strength of the plant roots, we have discovered that surprising and valuable benefits heretofore unknown in reinforced sod mats are possible. Surprisingly small amounts of discrete fibers are used to reinforce the layer of planting medium and resulting sod mats. By propagating the sod mats using discrete fiber in the layer of planting medium, we have found that the discrete fibers help stabilize the layer of planting medium to the effects of heavy rains prior to or just after germination. As the plants grow, the roots penetrate and entangle with the discrete fibers in the layer of planting medium. Plants which have multiple roots in the upper root portion are particularly effective in these sod mats because these multiple roots formed from secondary root growth and/or fibrous root growth is particularly effective in entangling with and forming a maze of roots and discrete fibers to reinforce the layer of planting medium. In this specification, a plant with multiple roots in the upper root portion is defined as a plant which has multiple roots, multiple fibrous roots, or multiply branched roots in the layer of planting medium. Multiple roots of upper root portion are defined in this specification as all of the roots in the layer of planting medium above the sod reinforcement of plants which have secondary roots, multiple fibrous roots, or the small multiple root branches growing in the layer of planting medium. Multiple roots of the upper root portion are Reference Numeral 55 in FIGS. 2, 3, and 4. Preferred plants with multiple roots are moncots.

Some illustrative examples of plants with multiple roots in the upper root portion are cosmos bipinnatus, Kentucky Blue Grass, tall fescue, and bent rye grass. A plant with only 1 root, perhaps a tap root, is an example of plant without multiple roots in the upper root portion. Sod mats comprising greater than 15% plants with multiple roots in the upper root portion are preferred and sod mats comprising greater than 25% plants with multiple roots in the upper root portion are more preferred and sod mats comprising greater than 35% plants with multiple roots in the upper root portion are even more preferred and sod mats comprising greater than 50% plants with multiple roots in the upper root portion are most preferred. These sod mats are particularly useful for soil stabilization applications and playing fields because of the improved maze of roots and discrete fibers formed. Another preferred embodiment of this invention is where a plant with an upper root portion having multiple roots which entangles with the discrete fibers to form a maze of roots and discrete fibers also has a lower root portion which penetrates and entangles with the sod reinforcement. This forms a particularly useful sod mat which is quicker and easier to harvest and handle and which makes particularly effective soil stabilization sod mats and playing field sod mats. Sod mats comprised of greater than 15% plants wherein said plants have an upper root portion of multiple roots and said lower root portion penetrates and entangles with sod reinforcement are preferred. Sod mats comprised of greater than 25% plants wherein said plants have an upper root portion of multiple roots and said lower root potion penetrates and entangles with sod reinforcement are more preferred. Sod mats comprised of greater than 35% plants wherein said plants have an upper root portion of multiple roots and said lower root potion penetrates and entangles with sod reinforcement are even more preferred. Sod mats comprised of greater than 50% plants wherein said plants have an upper root portion of multiple roots and said lower root potion penetrates and entangles with sod reinforcement are most preferred.

Figure 4:
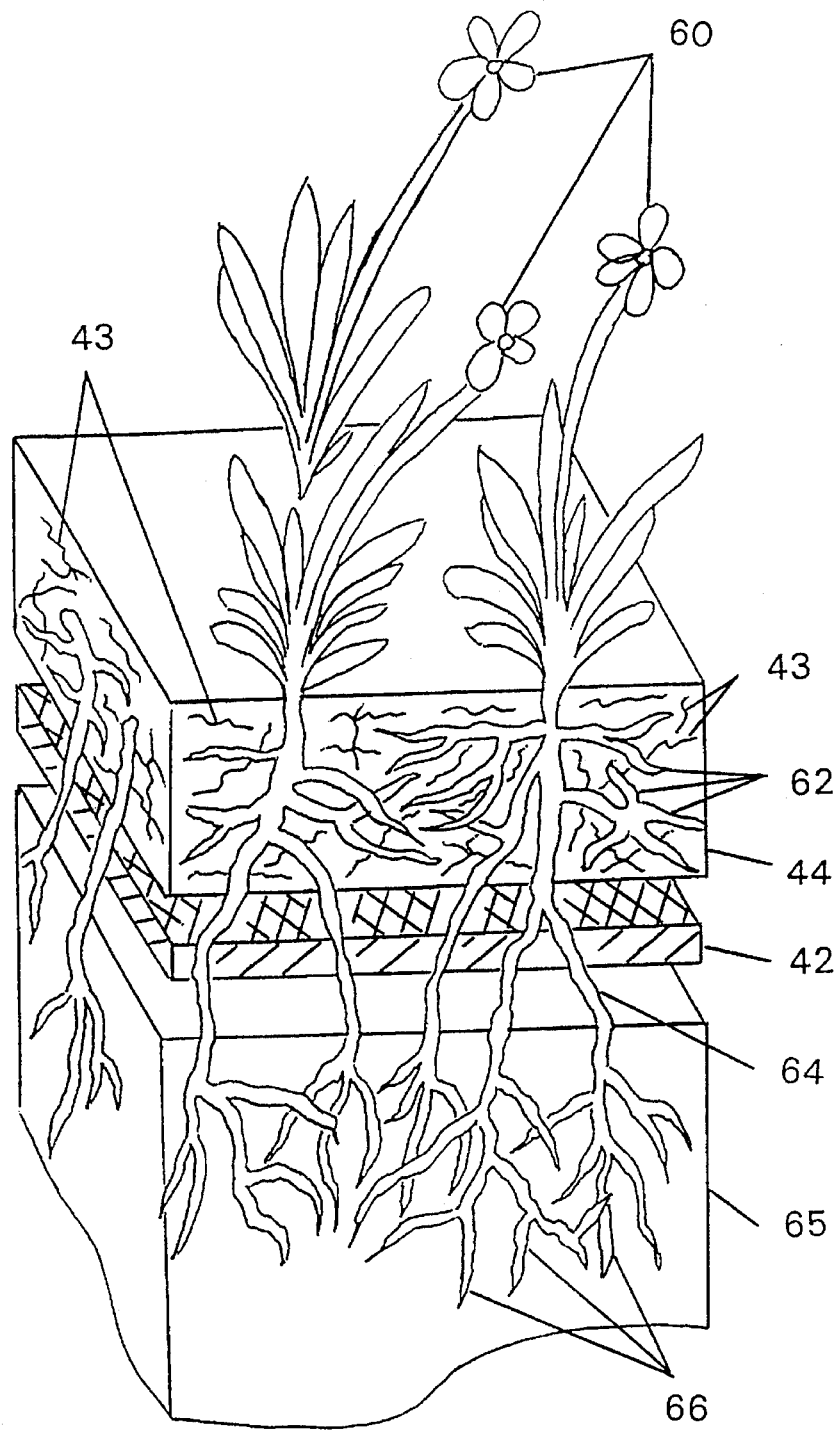
FIG. 4 is an artist's conception of the important root penetration and entanglement in an installed sod mat anchored to the soil below.

FIG. 4 is an artist's conception of one embodiment of this invention with the important root penetration and entanglement in an installed sod mat anchored to the soil below. Reference Numeral 42 is the sod reinforcement. Reference Numeral 43 represents the discrete fiber reinforcement in the planting medium. Reference Numeral 44 represents the planting medium. After the sod mats are transplanted the plant roots continue to grow and entangle with the discrete fibers forming a maze of entangled roots and discrete fibers which in turn is a tough stable surface to the sod mat which is very resistant to erosion, soil compaction, and wear and tear. Reference numeral 60 represents the mature plants of an installed sod mat. Reference Numeral 62 illustrates the multiple roots of the upper root portion of the mature plants entangled with the discrete fibers in a continuous maze reinforcing the planting medium. Reference Numeral 64 represents the roots of the lower root portion penetrating the sod reinforcement. Reference Numeral 66 represents the roots which bond the sod mat to the soil below. FIG. 4 shows that the roots bonding the sod mat to the soil below are protected with both the tough maze of entangled roots with the discrete fibers in the layer of planting medium and the sod reinforcement (Reference Numeral 42). The sod reinforcement (Reference Numeral 42) can effectively distribute stress and thus further reduce soil compaction below. Nonwoven fabrics are very effective at distributing these stresses and reducing soil compaction below and will be discussed further herein below. Sod mats of this invention will also bond to artificial turf. Artificial turf can effectively be covered with sod mats of this invention to cushion the playing surface and the sod reinforcement (Reference Numeral 42) performs a unique and protective covering to the roots penetrating the sod mat and bonding the reinforcement to the artificial turf. An additional unique benefit is realized when sod reinforcements such as a nonwoven fabric are used because the nonwoven sod reinforcement helps to retain moisture for the roots of the installed sod. Thus sod mats of this invention because of their unique structure can help to reduce soil compaction, can aid in retaining moisture, aid in soil stabilization, and can improve the toughness of the surface layer. If soft synthetic resin particles are added to the layer of planting medium, further resistance to soil compaction and improved sod mat can be realized. These advantages are unique to the sod mats of this invention and are necessary for their unique utility. Further more from current evaluations, it is apparent the selected sod reinforcement (Reference Numeral 42) can influence how quickly and effectively the maze of entangled roots with discrete fibers in the planting medium is formed along with how quickly the plant roots bond with the soil below. For instance, heavy nonwoven sod reinforcements tend to encourage quicker formation of the maze of entangled roots with the discrete fibers in the planting medium while very open netting tends to encourage quicker bonding to the soil below. Nonwoven sod reinforcements with a selected basis weight and having apertures such as those discussed herein below are an effective means to customize performance for the particular application. Thus not only are these unique advantages of reinforcement important to the performance installed sod mats, the advantages can be optimized for the particular application by using the disclosure herein and some ordinary experimentation.

We believe the resulting sod mat is especially effective because it forms a unique very strong, 3 dimensional structure very quickly during propagation and continues to improve because of root growth after installing the sod because the root growth strengthens the maze of entangled roots with in the planting medium and the root growth through the sod reinforcement improves the bond to the soil below. For instance in high erosion applications, the water runs over the tough substantially continuous maze of entangled roots with the discrete fibers in the layer of planting medium and thus this maze serves to protect the roots which penetrate the sod reinforcement and these protected roots bond the installed sod mat to the soil below. In high impact applications such as golf courses, the tough continuous maze of entangled roots with the discrete fibers in the layer of planting medium helps to absorb the impact of golf club swings and thus again protects the roots which penetrate the sod reinforcement below. In high impact applications such as golf courses or playing fields, the tough continuous maze of entangled roots with the discrete fibers in the layer planting medium which includes soft synthetic resins are especially effective in helping to reduce or eliminate damage to the roots penetrating and bonding the sod mat to the soil below (while retaining the soft resin particles in the sod). No other portable sod mat develops this unique cooperation among important elements to form tough, multilayer stable sod mat and which continues to get tougher after installation. Both the sod reinforcement and the discrete fiber reinforced planting mediums are necessary to the unique propagation and actual application property advantages such as erosion resistance discussed herein. In addition, plant sod mats with plants with lower root density are more quickly propagated with improved handling characteristics. Grass sod mats very resistant to soil erosion are quickly and easily propagated. Border sods and accent strips can be readily grown with improved handling characteristics. Grass sod mats with good softness are effectively propagated using soft synthetic resin particles such as recycled tire rubber. These grass sod mats may be propagated in large sizes, be quickly installed with a minimum of labor, and with very good resilience to protect the players. In addition, these grass sod mats can be played on shortly after installation. Sod mats of this invention are relatively thick and heavy. This aids water and nutrient retention in the planting medium, reduces the chance of root binding, and tends to improve overall the toughness of these sod mats in use. Preferred sod mats of this invention have a weight per unit area of greater than 4 kg per square meter (kgpsm) and sod mats having a weight per unit area of greater than 6 kgpsm are more preferred and sod mats having a weight per unit area of greater than 8 kgpsm are even more preferred and sod mats having a weight per unit area of greater than 12 kgpsm are most preferred. Preferred sod mats of this invention have a weight per unit area of less than 60 kgpsm and sod mats having a weight per unit area of less than 50 kgpsm are more preferred and sod mats having a weight per unit area of less than 40 kgpsm are even more preferred. The layer of planting medium is preferably greater than 1.2 cm thick and more preferably greater than 1.5 cm thick and even more preferably greater than 1.8 cm thick. The layer of planting medium is preferably less than 7.5 cm thick and more preferably less than 6 cm thick and even more preferably less than 5 cm thick. The layer of planting medium depth is adjusted to the preferable depth of the particular plant species and end-use application of the sod mat.

The discrete fibers reinforcing the planting medium are preferably comprised of stable fibers. A discrete fiber as used herein refers to an elongate structure with at least two ends and ratio of the length of the elongate structure to the width of the elongate structure of greater than 50/1. Preferred stable discrete fibers are inorganic fibers and synthetic resin fibers. Stable synthetic resins are especially preferred for their long term reinforcement of the stabilized sod mat. Preferred stable discrete fibers are flexible. Preferred stable discrete fibers include fibers of polyolefin chemistry, polyester chemistry and nylon chemistry. Preferred stable discrete fibers, which are inorganic fibers, are mineral wool and glass fibers. The preferred test to confirm stability for the discrete fibers in the layer of planting medium is the soil burial test AATCC Test Method 30-1989 Test 1. The preferred soil is composed of 50% by volume of top soil or leaf mold, 5% by volume of well rotted and shredded cow manure, and 45% by volume of coarse sand. The discrete fibers are tested by the soil burial test AATCC Test Method 30-1989 Test 1 for a period of time. An exposure period of 52 weeks is used. After a 52 week soil burial test exposure the discrete fibers are carefully removed and rinsed and allowed to dry out for 7 days at 23° C. The fibers are preferred stable discrete fibers for reinforcing the planting medium within the meaning of the soil burial test AATCC Test Method 30-1989 Test 1 in this specification if the suspected discrete fibers lose less than 70% of their initial strength and discrete fibers which lose less than 65% of their initial strength are more preferable and discrete fibers which lose less than 60% of their initial strength are even more preferable and discrete fibers which lose less than 50% of their initial strength are most preferable. The standard ASTM test methods are used to measure tensile strength such ASTM D 2256-90. These tests are known to those skilled in the art.

The length of the discrete fibers reinforcing the planting medium is important to the development of tough, stable sod mats of this invention. Longer fibers promote earlier and improved reinforcement of the layer of planting medium. Shorter discrete fibers improve the mixing and handling of the planting medium. Discrete fibers in the planting medium of less than or equal to about 25 cm are preferred and discrete fibers in the planting medium of less than or equal to 15 cm are more preferred and discrete fibers in the planting medium of less than or equal to 5 cm are even more preferred and discrete fibers in the planting medium of less than or equal to 3 cm are most preferred. The discrete fibers in the planting medium of greater than or equal to about 0.2 cm are preferred and discrete fibers in the planting medium of greater than or equal to 1 cm are more preferred and discrete fibers in the planting medium of greater than or equal to 1.5 cm are even preferred and discrete fibers in the planting medium of greater than or equal to 2 cm are most preferred. Particular applications can have especially preferred ranges. Soil stabilization sod mats with discrete fibers in the layer of planting medium comprising fiber lengths from about 15 to 1 cm are preferred and soil stabilization sod mats with discrete fibers in the layer of planting medium having fiber lengths from 10 to 1.5 cm are more preferred and soil stabilization sod mats with discrete fibers in the layer of planting medium having fiber lengths from 5 to 2 cm are even more preferred. Border plant sod mat strips with discrete fibers in the layer of planting medium having fiber lengths from 7 to 1 cm are preferred and border plant sod mat strips with discrete fibers in the layer of planting medium having fiber lengths from 5 to 1 cm are more preferred and border plant sod mat strips with discrete fibers in the layer of planting medium having fiber lengths from 4 to 2 cm are even more preferred.

The shorter discrete fibers are preferred in tufts of multiple discrete fibers such as tufts of mineral wool fibers. The tufts of discrete fibers are preferably small to promote mixing with the planting medium. The discrete fibers are also effective in other small fiber groupings such as yarns or balls of fibers. The effective tufts of discrete fibers can contain many discrete fibers. Effective tufts of discrete fibers can be entangled or bonded together. An example of an effective tuft of discrete fibers are mineral wool fibers point bonded with a glue. Discrete fibers of synthetic resins such as polyolefins, polyesters, and nylons are also effective when point bonded thermally or with an adhesive. Tufts of entangled discrete fibers are also effective. U.S. Pat. No. 4,803,803 is included by reference as an illustrative example and helpful guidance for those of ordinary skill in the art and is not meant to limit those tufts of discrete fibers useful in this invention. Tufts of discrete fibers can have an Effective Fiber Length which is longer than the individual discrete fibers it contains. The Effective Fiber Length is determined by: 1. measuring the diameter of the fibers in tuft, 2. calculating the cross-section (CS) of said fibers in square centimeters, 3. weighing said tuft in grams, 4. determining the density of said fibers in grams per square centimeter, and then using the following equation:

$$EFL(cm) = \frac{(CS \text{ in } cm^2) \times (\text{weight of tuft in grams})}{(\text{Density of fibers in grams per } cm^3)}$$

A tuft of discrete fibers with an EFL of greater than about 1 cm is preferred and an EFL of greater than 1.5 cm is more preferred and an EFL of greater than 2 cm is even more preferred. A tuft with a very high EFL can be effective. A tuft of discrete fibers with an EFL of less than about 1000 cm is preferred and a tuft with an EFL of less than 100 EFL is more preferred and a tuft with an EFL of less than 50 cm is even more preferred and a tuft of less than 20 cm is most preferred.

The discrete fibers in the planting medium is most effective in the sod mats of this invention when the discrete fibers are added to the layer of planting medium in particular volume percentage ranges. The Effective Discrete Fiber Volume Percentage (EDFVP) is calculated using the equation below:

$$EDFVP = \frac{\text{Discrete fiber Volume } (cm^3) \times 100}{\text{Effective Planting Medium Volume } (cm^3)}$$

Where:
DFV=Discrete fiber volume ($cm^3$)
EPMV=Effective planting medium volume ($cm^3$)
The Discrete fiber Volume (DFV) is determined by adding a known weight of discrete fibers to a planting medium. The discrete fiber volume is found using the following equation:

$$DFV = \frac{\text{Weight of discrete fibers (g)}}{\text{Density of discrete fiber resin (g per } cm^3)}$$

Those skilled in the art know how to determine density of the discrete fibers. EPMV is determined by dispersing this discrete fiber reinforcement in the planting medium and forming a layer on the sod growing surface, wetting it down, and finding the volume using the common volume formula multiplying length by width by depth. As an example calculation, 227 grams of 3 denier polypropylene staple fibers are added to planting medium. The density of the polypropylene discrete fibers is 0.91 g per $cm^3$. The discrete fiber volume is calculated at 249 cubic centimeters. This planting medium containing the dispersed discrete fibers is then placed on synthetic sod reinforcement and watered. The resulting planting medium is 100 cm wide, 100 cm long and 2.5 cm thick. The EDFVP is calculated at 1%. For many different sod mats of this invention, a broad range of EDFVP range can be effectively used in this invention. EDFVP of less than about 3% is preferred and an EDFVP of less than 1% is more preferred and a EDFVP of less than 0.3% is even more preferred and an EDFVP of less than 0.1% is most preferred. An EDFVP of greater than about 0.01% is preferred and an EDFVP of greater than 0.03% is more preferred and an EDFVP of greater than 0.05% is even more preferred. For sod mats of this invention, an EDFVP of from 3 to 0.01% is often preferred. For particular applications, some ranges are more particularly preferred based on current evaluations. For many commercial soil stabilization applications, an EDFVP of from 1 to 0.01% is preferred and an EDFVP of from 0.5 to 0.01% is more preferred and an EDFVP of from 0.1 to 0.01% is even more preferred and an EDFVP of between 0.08 to 0.01% is most preferred. For sod mats with improved resistance to soil compaction and containing soft synthetic resin particles, an EDFVP of from 1 to 0.01% is preferred and an EDFVP of from 0.3 to 0.01% is more preferred and an EDFVP of from 0.1 to 0.01% is even more preferred and an EDFVP of between 0.08 to 0.01% is most preferred.

We have discovered in this instant invention that low denier discrete fibers in the planting medium dramatically improves planting medium resistance to early rain erosion, facilitates good sod strength for early harvests, and aids good long term sod stabilization. Low denier discrete fibers improve reinforcement of the layer of planting medium with an unexpectedly low volume of fibers and low weight of synthetic resin. We currently believe this is because for a given weight of synthetic resin, more discrete fiber length is available for forming the maze of roots of the upper root portion and the discrete fibers in the layer of planting medium. For instance, a 6 dtex discrete fibers will have about 5 times more fiber length than 30 dtex fibers in an equivalent layer of planting medium with an equivalent volume percentage of discrete fibers to entangle with the plant roots of the upper root portion. In addition, low denier fibers are easier to handle and disperse into the planting medium. The low denier discrete fibers are very flexible in the layer of planting medium. A substantial amount of the discrete fibers reinforcing the layer of planting medium remain intact and unbroken by the penetrating roots. Applicants currently believe this is due to the exceptional flexibility of the fibers and their exceptional freedom to move during the propagation process. Fiber weight is measured in denier. Denier in dtex is by definition: "the mass in grams of a fiber 9,000 m long". It can be calculated with the following formula:

$$\text{Denier } (dtex) = \frac{\text{Fiber Mass (g)}}{\text{Fiber length (m)}} \times 9{,}000 \text{ m}$$

The determination of denier is well known to those skilled in the art. Discrete fibers in the layer of planting medium of less than or equal to about 25 dtex are preferred and more preferably are fibers of less than or equal to 8 dtex and even more preferably are fibers of less than or equal to 6 dtex and most preferably are fibers of less than or equal to 3 dtex. Discrete fibers in the layer of planting medium of greater than or equal to about 0.1 dtex are preferred and more preferably are fibers of greater than or equal to 0.2 dtex. Sod mat using a broad range of discrete fiber deniers are effective. The following discrete fiber deniers are preferred. Discrete fibers in the layer of planting medium from 0.1 to 25 dtex are preferred and discrete fibers in the layer of planting medium from 0.1 to 8 dtex are more preferred and discrete fibers in the layer of planting medium from 0.2 to 6 dtex are even more preferred and discrete fibers in the layer of planting medium from 0.2 to 3 dtex are most preferred. The discrete fibers reinforcing the layer of planting medium can also be advantageously described by their fiber diameter. Fiber diameter is measured in centimeters and is determined by optical microscopy or scanning electron microscopy. The determination of fiber diameter by these techniques is well known to those skilled in the art. As used herein, the diameter of a discrete fiber is the usual and ordinary definition of diameter of a round cross-section of the fiber. If the cross-section is not round, then diameter is the average of two perpendicular measurements across the cross-section. This is applicable to inorganic discrete fibers and synthetic discrete fibers. Discrete fibers in the layer of planting medium from 0.01 to 0.0002 cm in diameter are preferred and from about 0.006 to 0.0002 cm in diameter are more preferred and from 0.004 to 0.0003 cm in diameter are even more preferred and from 0.002 to 0.0005 cm in diameter are most preferred. Discrete fibers in the layer of planting medium which are crimped synthetic thermoplastic fibers are very effective. Crimped discrete fibers improve aeration of the planting medium and root entanglement.

Preferred discrete fibers are polyester, polyolefin and nylon fibers. Polyolefin fibers such as polyethylene and polypropylene are particularly preferred because of their low cost, good stability, and broad availability. Preferred polyethylenes are copolymers of polyethylene and higher alpha-olefins having 4 to 18 carbon atoms. Nylons such as nylon 6 or nylon 66 are particularly preferred for excellent water infiltration, root wetting, degradability, and general versatility. A preferable stable polyester is polyethylene terephthalate. Other examples of useful fiber chemistries comprise acrylics, and polyurethanes.

Sod mats with improved softness combined with excellent wear properties and excellent resistance to compaction can be effectively made with layers of planting medium using soft synthetic resin particles as a planting medium amendment. Elastomers are an preferred soft synthetic resin when used as a planting medium amendment. Illustrative examples of elastomers are styrene-butadiene elastomers, polyisoprene elastomers, polyethers elastomers, polybutadiene elastomers, polychloroprene elastomers, ethylene-propylene elastomers, thermoplastic elastomers, butyl elastomers, ethylene-propylene-diene terpolymer elastomers, and acrylic elastomers. Thermoplastic elastomers are a preferred type of soft synthetic resin. Butyl rubber and polybutadiene elastomers is another group of preferred soft synthetic resins. Representative information on these and example elastomers are discussed in the Kirk-Othmer Encyclopedia of Chemical Technology, Volume 8, 3rd edition, 1979, pages 446–460 and is provided for helpful guidance for those of ordinary skill in the art and is not meant to limit soft synthetic resins, elastomers, or rubbers useful in this invention. Cured elastomers typically have improved compression set and thus are preferred for many multiple high impact applications. Cured elastomers, for the purposes of this specification, are elastomers which are permanently cross-linked and are no longer thermally processible. Uncured elastomers, for the purposes of this specification, are soft synthetic resins which are not permanently cross-linked and are thermally processible. These terms are well known to those skilled in the art. Uncured elastomers such as POEs discussed herein below have typically lower processing costs, they can readily be formed into various low cost shapes, and when used in the unique tough continuous maze of entangled roots with the discrete fibers in the planting medium layer of the current invention, they are surprisingly effective. Hardness of soft synthetic resins is measured by ASTM D676. Soft synthetic resins preferably have a Shore D hardness of less than 60 and more preferably a Shore A hardness of less than 80 and even more preferably have a Shore A hardness of less than 65 and most preferably have a Shore A hardness of less than 55. Preferred soft synthetic resins have a Shore A hardness of greater than 30 and more preferably have a Shore A hardness of greater than 35 and even more preferably have a Shore A hardness of greater than 45. Round or pellet shaped soft synthetic resins can be effective as a planting medium amendment. A preferred shape of the soft synthetic resin particle is to have an aspect ratio of the length to the width of the soft synthetic resin particle of greater than 2/1 and more preferred is an aspect ratio of the length to the width of the soft synthetic resin particle of greater than 3/1 and even more preferred is an aspect ratio of the length to the width of the soft synthetic resin particle of greater than 4/1 and most preferred is an aspect ratio of the length to the width of the soft synthetic resin particle of greater than 6/1. The preferred aspect ratio is less than 100/1 and more preferred is an aspect ratio of less than 60/1 and even more preferred is an aspect ratio of less than 30/1. The soft synthetic resin particles can have different shapes. Preferred shapes are round, oval, irregular shapes, and fibrous. A preferred irregular shape is the shape of the rubber particles made from shredded tires. Another preferred shape is chopped extrudate from an extruder of soft synthetic resin such as a thermoplastic elastomer.

Elastomers or a soft synthetic resin polymer with alpha olefin monomers $C_2$ to $C_4$ in their backbone such as ethylene and propylene are preferred. A preferred example thermoplastic elastomer is a polyolefin elastomer (POE). An example of a polyolefin elastomer is ENGAGE® manufactured and sold by Dow Chemical Company. Illustrative examples of ENGAGE® are EG 8100. ENGAGE® POEs are ethylene alpha olefin copolymers. Some typical properties as published by Dow Chemical for EG 8100 are density by ASTM D-792 of 0.87 g/cc, percent comonomer (octene) ASTM D-1238 of 24%, Shore A hardness by ASTM D-2240 of 75, and a brittleness temperature of less than −76 degrees centigrade. Further examples and typical properties are included in Dow's product brochure and is included herein by reference. Ethylene propylene elastomers are also effective. UV stabilized polyolefin elastomers are preferred. Polyolefin elastomers of copolymers of ethylene and higher alpha olefins ($C_4$ to $C_{18}$) are preferred for their low cost, ease of processing into preferred shapes and availability. Current preferred dimensions of the soft synthetic resin particles are length of about 0.2–1.5 cm, width of 0.2–1 cm and thickness of 0.2–1 cm. Other sizes can be effectively used for particular applications. Fibers of soft synthetic resins can also be used as a planting medium amendment. Fibers of soft synthetic resins are preferably less than 0.02 cm in diameter and even more preferably less than 0.006 cm in diameter and even more preferably less than 0.004 cm in diameter. Shredded tire rubber is a preferred soft synthetic resin. Soft synthetic resins which retain a Shore A hardness of less than 70 at −4 degrees centigrade are preferred for playing fields and soft synthetic resins which retain a Shore A hardness of less than 65 at −4 degrees centigrade are more preferred for playing fields. The soft synthetic resin adds softness, resistance to compaction, and light weight to thin sod mats of the invention. Playing field sod mats which retain their softness even at low temperatures are especially preferred.

During propagation discrete fibers reinforcing the layer of planting medium become entangled with the plant roots and bind a substantial majority of the soft synthetic resin particles into the planting medium layer of the sod mat. Aspect ratios of the soft synthetic resin particles of greater than 2/1 aid in this mutual locking in process. This process of locking the soft synthetic resin particles in with the roots entangled with the discrete fibers reinforcing the layer of planting medium is both unique and very effective and is particularly useful for sod mats needing resistance to high and/or multiple impacts, resistance to soil compaction, and/or high erosion resistance. The holes in the sod reinforcement as used herein are defined as the largest repeating opening in the sod reinforcement such as the openings in netting or apertures in a nonwoven fabric as discussed herein (See for instance Reference Numeral 45 in FIG. 1). Sod reinforcements with maximum hole size smaller than the soft synthetic resin particle length are preferred because they help to retain the soft synthetic resin particles in the planting medium where they are most effective. The hole size for the purposes of this specification is defined as the maximum distance across the opening in centimeters. As a example the hole size of a rectangular opening in a netting is the diagonal from corner to opposite corner. Retaining the soft synthetic resin particles on top of the sod reinforcement during propagation improves the utility and effectiveness of the soft synthetic resin particles. Retaining the soft synthetic resin particles in the layer of planting medium and near the surface is particularly important in high impact applications such as playing fields and golf. A ratio of the maximum hole size of the sod reinforcement to the soft synthetic resin particle length of less than 0.8 is preferred and a ratio of the maximum hole size to soft synthetic resin particle length of less than 0.6 are more preferred and a ratio of the maximum hole size to soft synthetic resin particle length of less than 0.5 are even preferred and a ratio of the maximum hole size to soft synthetic resin particle length of less than 0.4 are most preferred. Soft synthetic resin particle length, as defined in this specification, is the longest mean average tip to tip distance across a statistically significant sample of said soft synthetic resin particles. As an example calculation, if the sod reinforcement consists of netting with openings of 0.2 cm and longest mean average tip to tip distance of the soft synthetic resin particle is 0.4 cm, then the ratio of the hole diameter to soft synthetic resin particle length is calculated to be 0.5. Sod mats of this invention have multiple new ways of functioning to improve resistance to soil compaction and long term impact absorbing performance. The maze of entangled roots of the upper root portion and discrete fibers bind a substantial amount of the soft synthetic resin particles in the layer of planting medium and the sod reinforcement with a low ratio of the hole diameter to soft synthetic resin particle length prevents the soft synthetic resins from escaping below. Nonwoven fabrics with apertures also have excellent water infiltration and drainage and are thus often preferred sod mats for sports field and golf course applications. The soft synthetic resin particles absorb much of the stress of multiple impacts thus reducing soil compaction. In addition, a sod reinforcement such as nonwoven fabric can distribute the stress of multiple impacts and thus further aid in reducing soil compaction.

The amount of soft synthetic resin particles which is added to the planting medium is based on the application. Higher amounts improve impact absorption, improve resistance to soil compaction, and lighten the sod mat. Lower amounts reduce impact absorption, reduce cost, and still retain good resistance to soil compaction. The Shore hardness of the soft synthetic resin, particle size and shape, and use temperature affect optimum amounts of soft synthetic resin. The sod mat thickness also plays a significant role which must also be considered. A soft synthetic resin particle volume percentage of the planting medium of less than 60% is preferred, and more preferred is a soft synthetic resin particle volume percentage of the planting medium of less than 33% and even more preferred is a soft synthetic resin particle volume percentage of the planting medium of less than 20% and most preferred is a soft synthetic resin particle volume percentage of the planting medium of less than 15%. A soft synthetic resin particle volume percentage of the planting medium of more than 0.5% is preferred, and more preferred is a soft synthetic resin particle volume percentage of the planting medium of more than 2% and even more preferred is a soft synthetic resin particle volume percentage of the planting medium of more than 3% and most preferred is a soft synthetic resin particle volume percentage of the planting medium of more than 4%.

We have discovered in this instant invention that the sod reinforcement is preferably a synthetic sod reinforcement. The synthetic sod reinforcement (Reference Numeral 42) in this invention is a coherent sheet of reinforcement which is lightweight, easily stored before use, and easily handled. The synthetic sod reinforcement is preferably less than 0.2 cm thick and more preferably less than .2 cm thick and even more preferably less than 0.1 cm thick and most preferably less than 0.05 cm thick. Synthetic sod reinforcements of greater than about 0.003 cm thick are preferred and synthetic sod reinforcements greater than 0.004 cm are more preferred and synthetic sod reinforcements greater than 0.005 cm are even more preferred. This sod reinforcement thickness facilitates both easy storage (such as on rolls) and reinforcement handling. Synthetic sod reinforcement wherein the synthetic sod reinforcement is a synthetic thermoplastic sod reinforcement is preferred. A preferred class of synthetic sod reinforcement is nonwoven fabric or web. Another preferred class of synthetic sod reinforcement is a synthetic netting. Another preferred class of sod reinforcement is a woven synthetic fabric. Examples of synthetic sod reinforcements are found in U.S. Pat. No. 4,336,668 issued to Decker, U.S. Pat. No. 4,941,282 issued to Milstein, U.S. Pat. No. 5,189,833 issued to Clark, U.S. Pat. No. 5,224,290 issued to Molnar et al, U.S. Pat. No. 5,345,713 issued to Molnar et al, and U.S. Pat. No. 5,346,514 issued to Molnar et al. These are meant as helpful examples and guidance for those of ordinary skill in art and are not meant to limit the synthetic sod reinforcements useful in this invention.

The synthetic sod reinforcement is preferably a light basis weight. Basis weight is measured in grams per square meter (gpsm). A synthetic sod reinforcement basis weight of less than or equal to about 100 gpsm is preferred and a basis weight of less than or equal to 50 gpsm is more preferred and a basis weight of less than or equal to 20 gpsm is even more preferred and a basis weight of less than or equal to 10 gpsm is most preferred. A synthetic sod reinforcement basis weight of greater than or equal to about 0.3 gpsm is preferred and a basis weight of greater than or equal to 1.5 gpsm is more preferred and a basis weight of greater than or equal to 3 gpsm is even more preferred. Particular applications have preferred synthetic sod reinforcement basis weights. A border plant sod mat having a synthetic sod reinforcement basis weight of from about 40 to 0.3 gpsm is preferred and more preferred is a basis weight of from 20 to 3 gpsm. Stabilized plant sod mats have a preferred basis weight from 100 to 10 gpsm and more preferred is a basis weight of from 50 to 10 gpsm and even more preferred is a basis weight of from 30 to 10 gpsm.

Preferred sod reinforcements of this invention have small fiber diameters. The small fiber diameters improve plant root entanglement and penetration while at the same time reducing the need for excess synthetic resin consumption. In addition, sod reinforcements with a many small fibers serves to distribute stresses from multiple impacts and hence, helps to reduce soil compaction. Fiber diameter is measured in centimeters and is determined by optical microscopy or scanning electron microscopy. The determination of fiber diameter by these techniques is well known to those skilled in the art. Sod reinforcement fibers of less than or equal to about 0.02 cm in diameter are preferred and fibers of less than or equal to 0.006 cm in diameter are more preferred and are fibers of less than or equal to 0.004 cm in diameter are even more preferred and fibers of less than or equal to 0.002 cm in diameter are most preferred. Sod reinforcements fibers of greater than or equal to about 0.0002 cm in diameter are preferred and more preferably are fibers of greater than or equal to 0.0003 cm in diameter and even more preferably are fibers of greater than or equal to 0.0005 cm in diameter. Synthetic thermoplastic sod reinforcement fibers are preferred to be from about 0.02 to 0.0002 cm in diameter and more preferably from 0.006 to 0.0002 cm in diameter and even more preferably from 0.004 to 0.0003 cm in diameter and most preferably from 0.002 to 0.0005 cm in diameter. The sod reinforcement fibers are preferably stable sod reinforcement fibers. The preferred test to confirm stability for the sod reinforcement fibers reinforcing the planting medium is the soil burial test AATCC Test Method 30-1989 Test 1. The sod reinforcement fibers are tested by the same method discussed herein above for discrete fibers and the same test results are used to determine stability. By using sod reinforcements with stable sod reinforcement fibers improved soil stabilization results.

Effective sod reinforcements wherein the synthetic sod reinforcement is a nonwoven fabric are made with many types of nonwoven fabrics. Preferred nonwoven fabrics comprise spunbond nonwovens, hydroentangled nonwovens, and carded nonwovens. The dry carded process generally uses cut staple fiber bonded together using usual art-known bonding techniques such as adhesive binders, heated calendar rolls, hot air, sonic, laser, pressure bonding needle punch and the like. Chemically bonded nonwoven fabrics generally use latex binders. Hydroentangled, melt blown, and spunbonded nonwovens are especially preferred types of nonwoven sod reinforcements because they are easily produced, highly versatile, have minimum chemical additives (for example, binders), and have good sod mat reinforcement characteristics. Pattern bonded nonwoven fabrics and pattern entangled nonwoven fabrics are particularly preferred because of their excellent ability to reinforce sod mats. Pattern bonding means that only localized regions of the nonwoven fabric are bonded and the remaining non-bonded fiber regions contain fibers which can move, entangle and otherwise promote excellent seedling root entanglement to form exceptional sod mats. For purposes of this specification, pattern entangled nonwoven fabrics are defined as nonwoven fabrics with very high fiber entanglement regions and very low fiber entanglement regions. For instance, if the entanglement is a factor of 2 higher in the high entanglement regions versus the low entanglement regions in pattern entangled nonwoven fabrics, the nonwoven fabric is a pattern entangled nonwoven fabric. Area bonding refers to fabrics where the fibers in the fabric are bonded at essentially all fiber junctions (or cross-over points) to each other. For the purposes of this specification, area entangled nonwoven fabrics have relatively uniform entanglement across the surface area. For instance, if the entanglement is less than a factor of 2 higher in the high entanglement regions versus the low entanglement regions in pattern entangled nonwoven fabrics, the nonwoven fabric is a area entangled nonwoven fabric. Further examples of these types of nonwoven fabrics is found in U.S. Pat. No. 5,346,514 and is included herein by reference.

Nonwoven fabrics comprising a number of different chemistries such as polyesters, polyolefins, acrylics, and nylon are preferred. Particularly preferred chemistries are polyesters, nylons, and polyolefins. Preferred polyolefins include polypropylene and polyethylene. An example of a preferred polyethylene copolymer is linear low density polyethylene. Other preferred polyethylenes are copolymers of polyethylene with higher alpha-olefins. Higher alpha olefins having 4 to 18 carbon atoms are particularly preferred. The basis weight of the nonwoven fabric and the tightness of the nonwoven fabrics can be used to affect the rate of root penetration through the sod reinforcement, the rate of root entanglement with the discrete fibers in the planting medium, and the rate of roots penetrating the soil below and bonding of the sod mat to the soil. This is an effective control parameter to produce custom sod installations meeting customer needs. For example, at very low basis weights or with very tight nonwoven fabrics, the rate of formation of the root entanglement with the discrete fibers in the layer of planting medium to form a tough maze is enhanced and the rate of bonding the installed sod mat to the soil below is somewhat delayed. This ability to customize the rate of formation of surface toughness and rate of installed sod mat bonding for particular applications is unique to the sod mats of this invention and very useful in the industry.

The technology to produce nonwoven fabrics is well known and well documented in the open art. A particularly well known reference is the Kirk-Othmer Encyclopedia of Chemical Technology published by John Wiley and Sons, London/New York, Vol. 16, 3rd Edition, 1978, pages 72–124. Products of this general description are available commercially from companies such as Kimberly-Clark in Neenah, Wis., Johnson & Johnson Advanced Materials Co. in New Brunswick, N.J., and Poly-bond Incorporated in Charlotte N.C.

Preferred sod reinforcement have good water infiltration, especially in soil stabilization applications. By improving water infiltration, water runoff on slopes is reduced, the good drainage of sand based planting mediums is maintained, and soil erosion improved. In addition, installed sod mats are often healthier. Maintenance of good drainage in sand based sod mats is particularly important for sports fields and golf course applications. Good water infiltration can be accomplished in a number of preferred ways for sod reinforcement of this invention wherein the sod reinforcement is a nonwoven fabric. Examples include choosing the fiber base chemistry to facilitate easy water infiltration through the nonwoven sod mat reinforcement such as using Nylon 6 or Nylon 66. If polyolefin nonwoven sod reinforcements are used, then known hydrophilic treatments to the nonwoven fabric or fiber can be used. Examples include plasma treatments, surfactants, and rewet agents. Examples of hydrophilic treatments known in the art include U.S. Pat. No. 5,045,387 to Schmaltz, U.S. Pat. No. 5,033,172 to Harrington, U.S. Pat. No. 4,753,843 to Cook, U.S. Pat. No. 4,753,834 to Braun, U.S. Pat. No. 4,743 to Komatsu, application Ser. No. 07/745,224 by Molnar et al, and U.S. Pat. No. 4,578,414 to Sawyer and are herein included by reference. Still another method is to use heavy fibers in a lightweight fabric to increase pore size. Still another method is to incorporate bulking fibers to increase the porosity and thus, water infiltration. Suitable bulking fibers are usually crimped fibers of between about 2 and 15 cm long and more preferably from about 7 to 10 cm long and are stiffer than the general fibers in the nonwoven fabric in which they are used.

A particularly preferred method to improve water infiltration and reduce water runoff on slopes and in culverts is to use nonwoven reinforcements with apertures. Apertures may be designed into the manufacture of the nonwoven reinforcement or added by post modification. The preferred apertures are greater than or equal to about 0.015 cm in diameter and more preferably greater than or equal to 0.02 cm in diameter and even more preferably greater than or equal to 0.03 cm in diameter. The preferred apertures are normally less than or equal to 0.8 cm in diameter and more preferably less than or equal to 0.4 cm in diameter and even more preferably less than or equal to 0.25 cm in diameter and most preferably less than 0.15 cm. Preferred apertures are round, oval, diamond or rectangular shaped. The diameter is defined as the maximum distance across the aperture opening. Apertures preferably cover less than or equal to about 50% of the surface area of the nonwoven fabric and more preferably cover less than or equal to 30% of the surface area of the nonwoven fabric and even more preferably cover less than or equal to 15% of the surface area of the nonwoven fabric. Apertures normally cover greater than or equal to about 0.1% of the surface area of the nonwoven fabric and more preferably greater than or equal to about 0.3% of the surface area of the nonwoven fabric and even more preferably greater than or equal to 1% of the surface area of the nonwoven fabric. Nonwoven fabrics with apertures in a repeating and uniform pattern are preferred for ease of manufacture. Apertures are preferably spaced within 2 cm of each other and more preferably within 1 cm of each other. Nonwoven fabrics with apertures helps to assure good water infiltration and uniform root wetting. Use of apertures also improves the water infiltration in some of the lower cost nonwoven sod reinforcements such as those based on polyolefin chemistry. A method of manufacturing apertures in nonwoven fabrics is to use hot needling where the nonwoven fabric is passed under reciprocating needles or needles on rollers, the needles being heated to about the melting temperature of the nonwoven fabric. This and other technologies to produce apertures are well known in the art. Some illustrative examples include U.S. Pat. No. 4,886,632 to Van Iten et al., U.S. Pat. No. 4,588,630 by Shimalla, and U.S. Pat. No. 4,469,734 by Minto and are included by reference. Apertures in a nonwoven fabric forms unique low resistance passage ways for the root penetration and also for water infiltration. The size and amount of apertures in a nonwoven fabric can be used to affect the rate of root penetration through the sod reinforcement, the rate of root entanglement with the discrete fibers in the layer of planting medium, and the rate of roots penetrating the soil below and bonding of the sod mat to the soil. In addition, nonwoven fabrics with apertures have the additional value of reducing soil compaction by distributing the stresses of multiple impacts such as playing fields receive. By reducing soil compaction, soil aeration is enhanced and plant growth improved. Aperture size can also be used to retain the soft synthetic resin particles in new sod mats of this invention while retaining excellent water infiltration properties. Apertures are an effective control parameter to produce custom sod installations meeting customer needs.

Effective sod reinforcements wherein the synthetic sod reinforcement is a synthetic woven fabric function especially well for stabilized grass sod mats because they are easy to manufacture, inexpensive, and very strong. A preferable synthetic woven fabric with openings between the threads larger than about 0.1 cm in at least one direction is preferred and greater than 0.2 cm in at least one direction is more preferred and greater than 0.3 cm in at least one direction is even more preferred. Preferably the openings are less than 5 cm in at least one direction and more preferably less than 3 cm in at least one direction and even more preferably less than 2 cm in at least one direction. Ornamental sod mats have particular preferred openings to reduce or eliminate root girdling. Preferred openings in the woven fabric sod reinforcement are from 1.5 to 3 cm for ornamental sod mats and garden sod mats. The discrete fibers dispersed in the planting medium makes the sod reinforcement easier to cover with a layer of planting medium even with these larger openings. Smaller openings are preferred for grasses. Where strength and/or resistance to soil compaction is very important, openings in the woven fabric sod reinforcement from about 0.1 to 2 cm are preferred for grasses and openings of 0.2 to 0.5 cm are even more preferred for grasses. Where cost is very important, openings in the woven fabric sod reinforcement between 5 to 2 cm are preferred for grasses and openings of 5 to 3 cm are even more preferred for grasses. The fiber reinforced planting mediums improves the ease of covering woven fabrics with large openings, improves soil stabilization during heavy rains, and facilitates earlier harvests along with improved handling characteristics. It also adds an extra measure of long term soil stabilization to these sod mats. A synthetic woven fabric sod reinforcement facilitates earlier harvests, improves soil stabilization, improves resistance to soil compaction, and improves sod mat handling.

Effective sod reinforcements wherein the synthetic sod reinforcement is a synthetic netting function well for stabilized grass sod mats. Preferable synthetic netting has openings larger than 0.1 cm in at least one direction and more preferably greater than 0.2 cm in at least one direction and even more preferably greater than 0.3 cm in at least one direction. Preferably the openings are less than 5 cm in at least one direction and more preferably less than 3 cm in at least one direction and even more preferably less than 2 cm in at least one direction. Preferred openings in the netting sod reinforcement are from about 1.5 to 3 cm for ornamental sod mats and garden sod mats. The discrete fibers in the planting medium makes the sod reinforcement easier to cover with a layer of planting medium even with these larger openings. Smaller openings are preferred for grasses. Where strength and/or resistance to soil compaction is very important, openings in the netting sod reinforcement from about 0.1 to 2 cm are preferred for grasses and openings of 0.2 to 0.5 cm are even more preferred for grasses. Where cost is very important, openings in the netting sod reinforcement between 5 to 2 cm are preferred for grasses and openings of 5 to 3 cm are even more preferred for grasses. The fiber reinforced planting mediums improves the ease of covering netting with large openings, improves soil stabilization during heavy rains, and facilitates earlier harvests along with improved handling characteristics. It also adds an extra measure of long term soil stabilization to these sod mats. A synthetic netting fabric sod reinforcement facilitates earlier harvests, improves soil stabilization, improves resistance to soil compaction, and improves sod mat handling.

Sod reinforcements which improve the resistance to soil compaction are particularly preferred in the sod mats of this invention. Preferred sod reinforcements to reduce soil compaction are selected from the group consisting of nonwoven fabrics, woven fabrics with openings from 0.1 to 2 cm, and netting with openings from 0.1 to 2 cm.

As discussed above, it is preferable to have good early plant root penetration and entanglement with the sod reinforcement and the planting medium fibers to facilitate propagation of sod mats with earlier harvest times and good handling characteristics. This root penetration and entanglement with the sod reinforcement and the discrete fibers in the layer of planting medium creates early reinforcement of the sod mat. An effective way to estimate this reinforcement is to monitor and control root penetration through the sod reinforcement. Root penetration is measured by the following process:

1). A representative section of sod mat is chosen for measurement—usually about 20 centimeters by 20 centimeters.

2). The roots penetrating through the bottom of the sod reinforcement (Reference Numeral 42) are carefully shaved off with a sharp instrument such as a single edge razor and carefully added to a clean 2 liter beaker.

3). The shaved roots are then carefully washed with tap water by mixing and screening out the shaved roots and placing them in a separate clean 2 liter beaker.

4). Steps 2) and 3) are repeated four times (or until the roots are visually clean) to remove the dirt and nonroot foreign matter. The clean washed roots are then transferred to a pre-weighed lightweight aluminum weighing dish.

5). The washed roots in the pre-weighed dish are then dried for 8 hours at 110 degrees centigrade in a ventilated, temperature controlled oven.

6). The root penetration is then calculated as follows (20 cm by 20 cm sod mat):

| | |
|---|---|
| Gross weight (dried roots plus dish) | 5.57 g |
| Tare weight of aluminum dish | 5.42 g |
| | 0.15 g per 400 cm$^2$ of sod mat |

By numerous experiments, we have determined that a root penetration through the sod reinforcement of greater than or equal to about 0.07 grams per 400 square centimeters of sod mat are preferred and more preferable are root penetrations of greater than or equal to 0.1 grams per 400 square centimeters of sod mat and even more preferable are root penetrations of greater than or equal to 0.2 grams per 400 square centimeters of sod mat. To promote early harvest, sod mats with root penetration of less than or equal to about 20 grams per 400 square centimeters of sod mat are preferred and more preferable are sod mats with less than or equal to 15 grams per 400 square centimeters of sod mat.

As discussed herein above, preferred sod mats have plants with an upper root portion having multiple roots and a lower root portion which penetrates the sod reinforcement. The preferred amount of root penetration through the sod reinforcement was also discussed herein above. Sod mats of this invention with a weight ratio of the upper root portion to the lower root portion which penetrates the sod reinforcement of greater than 2/1 is preferred and a weight ratio of greater than 3/1 is more preferred and are very effective. Sod mats wherein the upper root portion has multiple roots are even more preferred as discussed herein above. Sod mats of this invention with a weight ratio of the upper root portion having multiple roots to the lower root portion which penetrates the sod reinforcement of greater than 2/1 are preferred and a weight ratio of greater than 3/1 is more preferred and a weight ratio of greater than 5/1 is even more preferred. This weight ratio is determined preferably for a representative section of sod mat with an area of 1000 square centimeters. The weight of the lower root portion which penetrates the sod reinforcement is determined using the procedure above for the representative sample of sod mat. The weight of the multiple roots of the upper root portion is determined using a similar procedure but using exceptional care to carefully and repeatedly wash the continuous maze of roots and discrete fibers and then separating said multiple roots from discrete fibers, then rewashing and drying and weighing as above. For particularly difficult mazes, estimations often can determine the proper range of the weight ratio. This range is usually sufficient to guide in propagation of these tough, 3 dimensional sod mats. Those skilled in the chemical arts can make an accurate analysis using the chemical difference in the discrete fibers and the roots for particularly difficult mazes. For instance, those skilled in the chemical arts can use the difference in chemical stability of the specific discrete fibers and the cellulosic multiple roots to determine the weight ratio. As an example calculation, if the multiple roots of the upper section weigh 0.75 grams and the lower root portion which penetrates the sod reinforcement is 0.25 grams, then the weight ratio of the multiple roots of the upper root portion to the lower root portion which penetrates the sod reinforcement is 3/1. Higher weight ratios improve surface toughness of the sod mat and help to improve resistance to early soil erosion.

Sod mats of this invention have many uses. Grass sod mats are particularly preferred for soil stabilization applications, areas of high foot traffic, sports fields, equestrian trails, and athletic fields. Sod mats of this invention are useful for erosion control on in areas needing soil stabilization. Some preferred examples are embankments, landscaped slopes, and culverts. Highways and developments have many such areas. Sod mats of this invention are useful for areas of high foot traffic such as walking trails, pathways, and golf tees. The improved soil stabilization, toughness, and improved resistance to soil compaction are advantageous for areas of high foot traffic. Sod mats of this invention are also very useful for sports fields. Their toughness, improved soil stabilization, improved resistance to soil compaction and resilience are important in many sports field applications. Athletic field goal areas are particularly prone to high wear which can advantageously use sod mats of this invention. Sod mats of this invention can improve sports fields needing better softness to prevent injures. Sod mats of this invention are also useful for equestrian trails. The above illustrative examples of some preferred uses are not meant to limit the uses of this invention in any way and are included herein for helpful guidance for those of ordinary skill in the art.

Although the nonwoven fabric and nonwoven web examples below are carried out with a sod reinforcement comprised of a nylon spunbond fabric, it will be understood that the invention is not limited thereto and that other synthetic sod reinforcements are to be included. Using this instant invention, sod mats of grasses, nutritional plants and ornamental plants are easily and cost effectively propagated. The resulting sod mats have very early time to harvest, are resistant to very early soil erosion, and stabilize the planting medium both long and short term. The sod mats are unique 3 dimensional engineering structure combining biomass (root structure) and man-made fibers to form a sod mat of viable plants having utility in number of important applications. They also make excellent living soil stabilization sod mats.

PROCESS DESCRIPTION—FIG. 5

Figure 5:
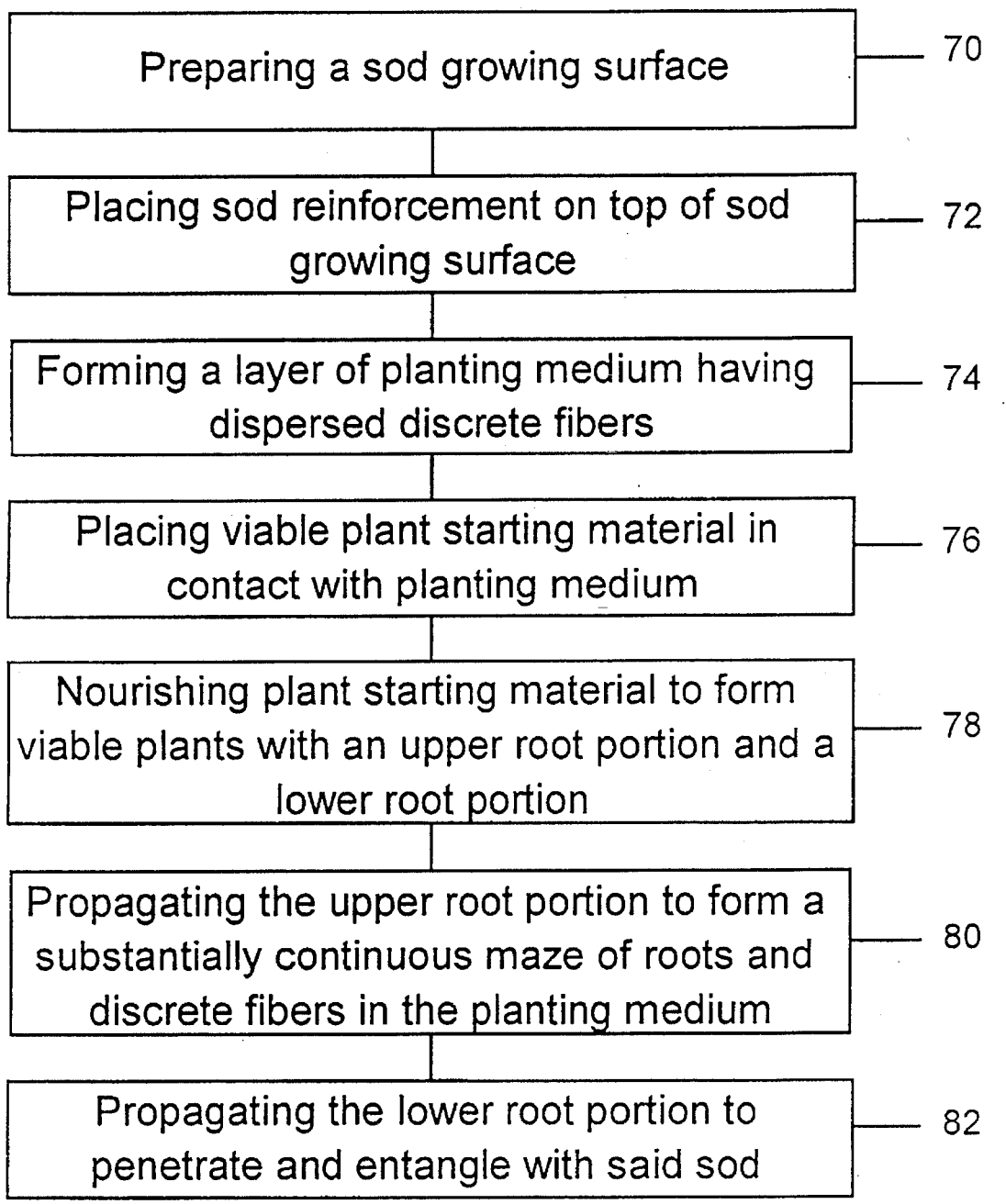
FIG. 5 is a block diagram of a simplified propagation process of this invention.

FIG. 5 is a simplified block diagram illustrating the general process of growing sod mats according to this invention. The seven general steps are: (1) step 70 preparing a sod growing surface. This consists of preparing field beds by tilling the soil, removing any major weeds left, and then grade and smooth out. Lay down a sod growing surface such as plastic weed guard like 6 mil black polyethylene film (Reference Numeral 40). Rows 4–8 feet wide by 100–200 feet are generally used. Aisles generally 3 feet wide are left between the rows for easy access. Common geotextiles are used between the rows to reduce weeds. Herbicides may also be used as desired to reduce weeds. Alternately flats can be effectively used as the sod growing surface. Flat size is selected based on normal considerations of one of ordinary skill in the art such as preferred size by end-use customer, optimum depth of the planting medium for the target plant species, availability, and cost. A flat with drain holes is normally preferred. The bottom of the flat usually serves as Reference Numeral 40—the sod growing surface. (2) step 72 placing sod reinforcement (Reference Numeral 42) on top of sod growing surface. (3) step 74 forming a layer of planting medium having dispersed discrete fibers. The depth of the layer of planting medium is selected based on the preferred planting depth for the selected plants and adding the discrete fiber reinforced planting medium. The discrete fibers in the layer of planting medium are preferably premixed with the planting medium. The discrete fibers in the layer of planting medium are alternately added to the planting medium as it is formed into a layer in the beds. The discrete fibers in the layer of planting medium can also be added in multiple thin layers to the planting medium as it is added to the beds and irrigation and/or rains will mix the planting medium with the discrete fiber reinforcement. Other preferred planting medium amendments may also be added here. If impact absorbing sod mats are desired, the soft synthetic resin particles are added in this step. The soft synthetic resin particles can be premixed in the planting medium. Alternately, the soft synthetic resin particles can be added to the planting medium as the layer of planting medium is formed. Drenching can also be useful at times. Rot resistant wooden four by fours can be used to contain the planting medium (Reference Numeral 44). Optionally, 1" by 2" rot resistant lumber or PVC pipe can also be used to further subdivide the bed into smaller plots for the target customer. (4) step 76 placing viable plant starting material in contact with planting medium. The seedlings, rooted cuttings, and the like can be added to the planting medium and/or the planting medium can be seeded. (5) step 78 nourishing viable plants for root growth forming an upper root portion and lower root portion. Proper nourishing includes normal care of the plants including such items as watering, drenching, appropriate light level control, planting medium amendments, and the like. (6) step 80 propagating upper root portion to form a maze of roots and discrete fibers in the layer of planting medium. (7) step 82 propagating lower root portion to penetrate and entangle with said sod reinforcement. The sod mats and/or border strips are watered and nourished preferably until the roots penetrate the sod reinforcement at greater than or equal to about 0.1 grams per 400 square centimeters of sod mat. This root penetration aids in good root entanglement with the discrete fibers in the layer of planting medium in order to form the maze of entangled roots with the discrete fibers. In addition, this root penetration ensures good root entanglement with the coherent sheet of synthetic sod reinforcement (Reference Numeral 42). Thus a 3 dimensionally reinforced sod mat is created by the roots with the substantially continuous maze of entangled roots with the discrete fibers and the sod reinforcement. This improves handling and shortens propagation periods. With the short propagation periods with grasses, sod mats for highway slope stabilization can propagated after much of the highway construction is done and just in time deliveries of freshly grown, erosion resistant sod can be delivered. If desired for environmental control reasons, common crop covers can be used to help warm the planting medium in the spring or for some protection from marauding birds. Hay or crop covers may be used to help to over winter the sod mats. Allow sod to mature for 1–18 months. The sod mats are harvested. The sod mats are harvested in sizes matching customers needs.

A method to propagate sod mats as above wherein said step 78 comprises nourishing viable plants in order to form a substantial amount of said viable plants with an upper root portion to form a substantially continuous maze of roots and discrete fibers in the planting medium and with a lower root portion which penetrates the sod reinforcement is preferred. By having the same plant entangle its roots with discrete fibers in the layer of planting medium and the same plant's roots penetrating and entangled with the sod reinforcement a unique 3 dimensional engineering structure is created in the sod mat which results in very good toughness and resistance to erosion. A method to propagate sod mats as above wherein said step 78 comprises nourishing viable plants in order to propagate a substantial majority of said viable plants with an upper root portion to form a substantially continuous maze of roots and discrete fibers in the planting medium and with a lower root portion which penetrates the sod reinforcement is more preferred. A method to propagate sod mats as above wherein said step 78 comprises nourishing viable plants in order to form substantially all of said viable plants with an upper root portion to form a substantially continuous maze of roots and discrete fibers in the planting medium and with a lower root portion which penetrates the sod reinforcement is even more preferred. A method to propagate sod mats as above wherein said step 80 comprises propagating upper root portion to form a substantially continuous maze is preferred. A method to propagate sod mats as above wherein said step 80 comprises propagating upper root portion to form a coherent web of tangled roots and discrete fibers in the layer of planting medium is also preferred. Plants with an upper root portion having multiple roots and lower root portion which penetrates the sod reinforcement are particularly effective because an effective continuous maze of roots and discrete fibers is formed along with a better reinforced sod mat especially for soil stabilization applications.

While some of the preferred embodiments of the instant invention have been discussed, it is understood that the invention is not limited to these, but is susceptible of numerous changes and modifications as are known to those of ordinary skill in the art using ordinary experimentation. One of ordinary skill in the art can use the embodiments of this instant invention with ordinary experimentation to develop preferred sod mats with discrete fiber reinforced planting mediums and sod reinforcements of this invention. It is also to be understood that the mutual reinforcement of the plant roots which penetrate the sod reinforcement and entangle with themselves, the planting medium fiber reinforcement, and the synthetic sod reinforcement plays an important roll in the good sod mat handling, stabilization, and propagation characteristics. Using the teachings of this specification, good sod mats of many plants can easily be grown. Using the guidance and teachings of this specification along with ordinary experimentation, those of ordinary skill in the art can develop and grow sod mats with good production characteristics, that are easy to handle, and that offer good soil stabilization. Custom sod mats can be grown which the balance with the landscapers' or customers' specific needs regarding resistance to soil compaction, soil stabilization, softness, and handling with shorter propagating periods and improved handling characteristics. The sod reinforcements are also easy to manufacture and handle. Sod mats using small amounts of synthetic resin for these applications are easily propagated.

EXAMPLES

The following examples will further aid and help to guide those of ordinary skill in the art to practice the invention. It is understood that the invention is not limited thereto, but is susceptible of numerous changes and modifications by those of ordinary skill in the art.

EXAMPLE 1

A layer of 6 rail plastic sod growing surface is laid down in four rows 18" wide and 25 ft long. A layer of 2 opsy PBN II synthetic sod reinforcement is laid on top of the plastic sod growing surface. PBN II is available from Fiberweb North America in Greenville, S.C. Some typical properties of PBN II 2 opsy are a machine direction tear strength of 21 lb, a transverse direction tear strength of 14 lb and an air permeability of 250 cfm/sf. Tear strength is done by Test Method D 1117-80 and air permeability is done by Test Method ASTM D 737 at 0.5 inch of water. About two inches municipal solid waste (MSW) planting medium is placed on top of the synthetic sod reinforcement. Interspersed in the MSW is 3–4 denier nylon fibers about 1–4 inches long with EDFVP % of 2%. A perennial rye grass seed is seeded by hand on top of the MSW. Normal feeding and care follow.

At three weeks after planting, a water hose is turned on one of the sod mats for about 15–20 minutes. Very good erosion resistance is apparent from this mistreatment of the sparsely germinated sod mat. A continuous maze of roots and discrete fibers is formed in the layer of planting medium.

The sod rolls are harvested in 8 weeks. They are installed in a culvert for testing. Good strong, stable healthy turf results. The maze of roots and discrete fibers continues to tangle and gain strength after installation which protects the sod reinforcement below. This maze of roots and discrete fibers in the planting medium layer gives unique protection to the roots bonded to the soil below. The roots entangled with the sod reinforcement adds to this unique protects the roots bonded to the soil below. No adverse effects from water erosion are apparent after 3 months. Further optimization of the propagation parameters according to the teachings herein above, can shorten propagation time even more.

SUMMARY, RAMIFICATIONS, AND SCOPE

Accordingly, one of ordinary skill in the art will see that valuable sod mats can be easily propagated according to this invention. The sod mats are very economical to grow. Sod mats of grasses and ornamental plants are easily and economically grown with this process. Flower sod mats can be harvested and sold in bloom. Newly installed grass sods have good early erosion resistance, resistance to soil compaction, and/or good softness. Both erosion resistance and softness are long lived. These sod mats have excellent root development and contain viable growing plants. The root structure remains essentially intact during harvesting. These sod mats have good root entanglement which reinforces them during handling and installation.

Although the specification and examples show many preferred embodiments, these are not to be construed as limiting the scope of the invention in anyway but merely as providing illustrations of some of the presently preferred embodiments of this invention. Various known techniques may be combined with this invention such as automating the production of these sod mats for greenhouses, cooling the sod mats for storage or shipping purposes, and modifying the propagation field so all irrigation water may be collected and recycled. Planting medium treatment agents can effectively be incorporated into the sod reinforcements to further simplify and/or improve propagation of plant sod mats. Illustrative examples of planting medium treatment agents include moisture absorbers, nutrients and plant growth regulators helpful to propagation. U.S. Pat. No. 5,139,566 to Zimmerman is a representative example known to those skilled in the art and is included herein by reference.

The scope of the invention should be determined by the appended claims and their legal equivalents, rather than by the preferred embodiments and examples given.

We claim:

1. A plant sod mat comprising:
   a. a sod reinforcement;
   b. a layer of planting medium on said sod reinforcement;
   c. stable discrete fibers dispersed in said layer of planting medium and wherein said discrete fibers are separate from and unconstrained by said sod reinforcement;

d. viable plants in said layer of planting medium and said viable plants having an upper root portion in said layer of planting medium above said sod reinforcement and a lower root portion in said sod reinforcement and below said sod reinforcement;

e. said upper root portion entangles with said discrete fibers to form a maze reinforcing said layer of planting medium; and f. said lower root portion penetrates and entangles with said sod reinforcement in order to bind said layer of planting medium and said plants to said sod reinforcement.

2. A sod mat according to claim 1 wherein said discrete fibers are less than 0.01 cm in diameter and said sod reinforcement contains sod reinforcement fibers of less than 0.02 cm in diameter.

3. A sod mat according to claim 1 wherein:

a. said discrete fibers are synthetic resin fibers of less than 8 dtex;

b. said sod reinforcement has sod reinforcement fibers of less than 0.01 cm in diameter;

c. said upper root portion has multiple roots; and d. said sod mat has a weight ratio of said multiple roots of said upper root portion to said lower root portion which penetrates said sod reinforcement of greater than 2/1.

4. A sod mat according to claim 3 used as a sod mat for sports fields.

5. A sod mat according to claim 3 used as a sod mat on embankments, landscaped slopes, and culverts.

6. A sod mat according to claim 1 wherein:

a. said sod mat has a thickness of greater than 1.6 cm;

b. said sod mat has a weight per unit area of greater than 8 kgpsm; and c. said discrete fibers are elongate structures with a length to width ratio of greater than 50/1.

7. A sod mat according to claim 1 wherein:

a. said upper root portion has multiple roots; and b. said sod mat has a weight ratio of said multiple roots to said lower root portion which penetrates said sod reinforcement of greater than 2/1.

8. A sod mat according to claim 1 wherein said EDFVP is from 0.1 to 0.01%.

9. A sod mat according to claim 1 further comprising soft synthetic resin particles having an aspect ratio of less than 30/1 dispersed in said layer of planting medium.

10. A sod mat according to claim 9 wherein said sod reinforcement has holes and a ratio of the hole diameter to the soft synthetic resin particle length is less than 0.8.

11. A sod mat according to claim 9 wherein said sod reinforcement has holes and a ratio of the hole diameter to the soft synthetic resin particle length is less than 0.5.

12. A sod mat according to claim 1 wherein said discrete fibers comprise inorganic fibers.

13. A sod mat according to claim 1 wherein said maze is a tangled web of roots of said upper root portion and discrete fibers in said layer of planting medium.

14. A sod mat according to claim 1 wherein greater than 25% of said plants have multiple roots in said upper root portion.

15. A sod mat according to claim 3 wherein said discrete fibers are in small fiber groupings having an Effective Fiber Length of greater than 1 cm.

16. A sod mat according to claim 3 wherein:

said maze is a tangled web of roots of said upper root portion and said discrete fibers in said layer of planting medium; and further comprising soft synthetic resin particles dispersed in said layer of planting medium.

17. A sod mat according to claim 16 wherein greater than 25% of said plants have multiple roots in said upper root portion.

18. A plant sod mat comprising:

a. a sod reinforcement having a thickness of less than 0.2 cm;

b. a layer of planting medium having a thickness of greater than 1.2 cm on said sod reinforcement;

c. stable discrete fibers in said layer of planting medium and wherein said discrete fibers are separate from and unconstrained by said sod reinforcement;

d. viable plants in said layer of planting medium and said plants having an upper root portion in said layer of planting medium above said sod reinforcement and a lower root portion in said sod reinforcement and below said sod reinforcement;

e. said upper root portion entangles with said discrete fibers to form a substantially continuous maze reinforcing said layer of planting medium; and f. said lower root portion penetrates and entangles with said sod reinforcement in order to bind said layer of planting medium and said plants to said sod reinforcement and said lower root portion which penetrates through said sod reinforcement is greater than 0.07 grams per 400 square centimeters of said sod mat.

19. A sod mat according to claim 1 further comprising soft synthetic resin particles having an aspect ratio of less than 30/1 dispersed in said layer of planting medium and said soft synthetic resin having a Shore A hardness less than 80.

20. A sod mat according to claim 19 wherein said soft synthetic resin particles are cured.

21. A sod mat according to claim 19 wherein said soft synthetic resin particles are uncured.

22. A sod mat according to claim 19 wherein:

a. said upper root portion has multiple roots;

b. said sod mat has a weight ratio of said multiple roots to said lower root portion which penetrates said sod reinforcement of greater than 2/1; and c. said maze substantially binds said soft synthetic resin particles within said layer of planting medium.

23. A sod mat according to claim 18 wherein said discrete fibers are from 0.1 to 6 dtex and said sod reinforcement has a basis weight of less than 100 gpsm.

24. A sod mat according to claim 18 wherein:

a. said EDFVP is from 0.5 to 0.01%; and b. said sod mat has a weight ratio of said upper root portion to said lower root portion which penetrates said sod reinforcement of greater than 2/1.

25. A sod mat according to claim 18 wherein said EDFVP is from 0.1 to 0.01%.

26. A plant sod mat comprising:

a. a sod reinforcement having a thickness between 0.003 to 0.2 cm; b. a layer of planting medium having a thickness between 1.2 to 7.5 cm on said sod reinforcement;

c. stable discrete fibers in said layer of planting medium and wherein said discrete fibers are separate from and unconstrained by said sod reinforcement;

d. viable plants in said layer of planting medium and said viable plants having an upper root portion in said layer of planting medium above said sod reinforcement and a lower root portion in said sod reinforcement and below said sod reinforcement;

e. said upper root portion entangles with said discrete fibers to form a maze reinforcing said layer of planting medium; and f. said lower root portion penetrates and entangles with said sod reinforcement in order to bind said layer of planting medium and said plants to said sod reinforcement.

27. A plant sod mat according to claim 26 wherein:

a. said discrete fibers comprise fibers selected from the group consisting of polyolefin, polyester, and nylon fibers; and b. further comprising soft synthetic resin particles in said planting medium and said soft synthetic resin particles comprising a synthetic resin selected from the group consisting of butyl rubber and polybutadiene elastomers.

28. A plant sod mat according to claim 26 wherein said discrete fibers comprise inorganic fibers.

29. A sod mat according to claim 26 wherein:

a. said discrete fibers comprise synthetic resin fibers from 0.006 to 0.0002 cm in diameter;

b. said sod reinforcement has sod reinforcement fibers from 0.02 to 0.0002 cm in diameter; and c. said upper root portion has multiple roots.

30. A sod mat according to claim 29 further comprising soft synthetic resin particles having an aspect ratio of less than 30/1 in said layer of planting medium and said soft synthetic resin having a Shore D hardness less than 60.

31. A sod mat according to claim 26 wherein:

a. said layer of planting medium has a thickness of greater than 1.5 cm;

b. said discrete fibers are elongate structures with a length to width ratio of greater than 50/1; and c. said sod mat has a weight per unit area of greater than 8 kgpsm.

32. A sod mat according to claim 26 wherein:

a. said upper root portion has multiple roots; and b. said sod mat has a weight ratio of said multiple roots to said lower root portion which penetrates said sod reinforcement of greater than 2/1.

33. A sod mat according to claim 26 further comprising soft synthetic resin particles having an aspect ratio of less than 30/1 dispersed in said layer of planting medium and said soft synthetic resin having a Shore A hardness less than 80.

34. A sod mat according to claim 32 wherein said sod reinforcement has holes and a ratio of the hole diameter to the soft synthetic resin particle length is less than 0.8.

35. A sod mat according to claim 26 wherein:

a. said discrete fibers comprise synthetic resin fibers having a diameter from 0.004 to 0.0003 cm;

b. said sod reinforcement has sod reinforcement fibers from 0.006 to 0.0002 cm in diameter; and c. said upper root portion has multiple roots.

36. A sod mat according to claim 35 wherein said discrete fibers have an Effective Discrete Fiber Volume Percentage from 1 to 0.01%.

37. A sod mat according to claim 35 used as a sod mat for sports fields.

38. A sod mat according to claim 35 used as a sod mat on embankments, landscaped slopes, and culverts.

39. A sod mat according to claim 26 used as a sod mat for sports fields.

40. A sod mat according to claim 26 used as a sod mat on embankments, landscaped slopes, and culverts.

41. A sod mat according to claim 26 for use in areas of high foot traffic.

* * * * *